United States Patent
Sakurai et al.

(10) Patent No.: US 7,575,705 B2
(45) Date of Patent: Aug. 18, 2009

(54) METHOD FOR MANUFACTURING A MAGNETIC RECORDING MEDIUM UTILIZING FIRST AND SECOND IMPRINT STAMPERS

(75) Inventors: Masatoshi Sakurai, Tokyo (JP); Yoshiyuki Kamata, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/691,774

(22) Filed: Mar. 27, 2007

(65) Prior Publication Data

US 2007/0211592 A1    Sep. 13, 2007

Related U.S. Application Data

(62) Division of application No. 10/945,030, filed on Sep. 21, 2004, now abandoned.

(30) Foreign Application Priority Data

Sep. 22, 2003 (JP) .............................. 2003-330266
Sep. 30, 2003 (JP) .............................. 2003-342541

(51) Int. Cl.
*B28B 3/00* (2006.01)
*G11B 5/70* (2006.01)

(52) U.S. Cl. .................... 264/319; 264/293; 428/848.1; 977/887

(58) Field of Classification Search ................. 264/293, 264/319; 977/887, 883; 428/848.1
See application file for complete search history.

(56) References Cited

U.S. PATENT DOCUMENTS

| 6,228,562 | B1 * | 5/2001 | Kawanishi ................. 430/321 |
| 6,757,116 | B1 | 6/2004 | Curtiss et al. |
| 6,841,224 | B2 | 1/2005 | Kamata et al. |
| 6,977,108 | B2 | 12/2005 | Hieda et al. |
| 2002/0168548 | A1 | 11/2002 | Sakurai et al. |
| 2005/0069732 | A1 | 3/2005 | Kamata et al. |
| 2006/0076509 | A1 | 4/2006 | Okino et al. |

FOREIGN PATENT DOCUMENTS

| JP | 3-280231 | 12/1991 |
| JP | 11-224422 | 8/1999 |
| JP | 2000-306227 | 11/2000 |
| JP | 2002-334414 | 11/2002 |

OTHER PUBLICATIONS

U.S. Appl. No. 11/691,774, filed Mar. 27, 2007, Sakurai, et al.

* cited by examiner

*Primary Examiner*—Matthew J. Daniels
(74) *Attorney, Agent, or Firm*—Oblon, Spivak, McClelland, Maier & Neustadt, P.C.

(57) ABSTRACT

An imprint stamper for manufacturing a recording medium includes a first transfer region which corresponds to a servo region of a recording medium using a sector servo system and has a pattern with a plurality of quadrilateral recess or protrusion portions formed in a surface thereof, and a second transfer region which corresponds to a data region of the recording medium and has a pattern with a plurality of dots of recess or protrusion portions arrayed in a form of a hexagonal lattice in a surface thereof.

4 Claims, 19 Drawing Sheets

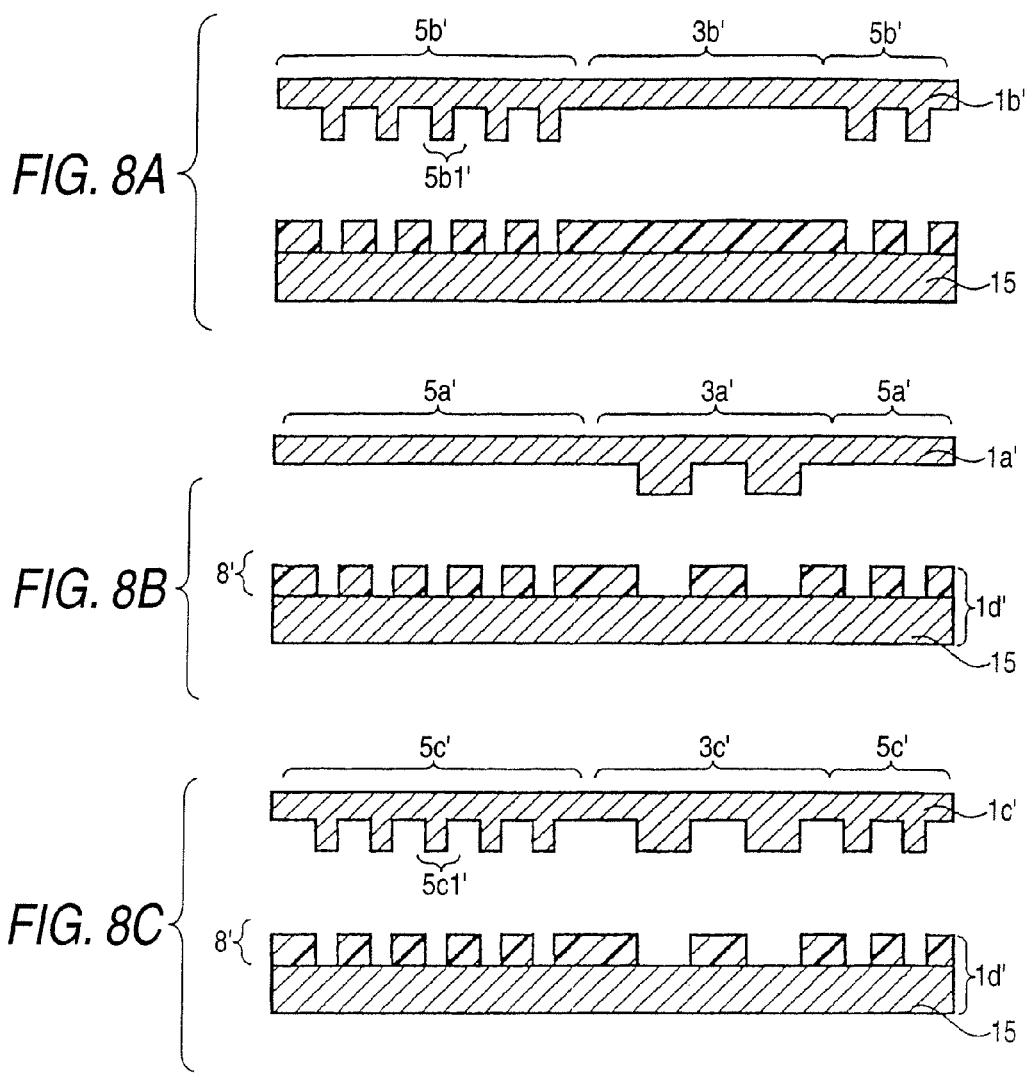

METHOD FOR MANUFACTURING A MAGNETIC RECORDING MEDIUM UTILIZING FIRST AND SECOND IMPRINT STAMPERS

CROSS-REFERENCE TO RELATED APPLICATIONS

This application is a divisional of U.S. application Ser. No. 10/945,030 filed Sep. 21, 2004, and is based upon and claims the benefit of priority from the prior Japanese Patent Applications No. 2003-330266 filed on Sep. 22, 2003 and No. 2003-342541 filed on Sep. 30, 2003;

The entire contents of which are incorporated herein by reference.

BACKGROUND OF THE INVENTION

1. Field of the Invention

The present invention relates to an imprint stamper for manufacturing a magnetic recording medium, a method for manufacturing the imprint stamper, a magnetic recording medium, a method for manufacturing the magnetic recording medium, a method for recording/reproducing information, and an information recording/reproducing apparatus.

2. Background Art

In recent years, exponential improvement of functions in information equipment such as personal computers has brought about more and more expectations on information recording/reproducing apparatus having high recording density. In order to improve the recording density, the dimensions of a recording material of each recording cell or each recording mark serving as a write unit for recording in a recording medium have to be made very small.

Generally, a polycrystal having a wide granular variation of single crystals is used for a recording layer of a magnetic recording medium such as a hard disk. Due to thermal fluctuation generated in the single crystals, recording becomes unstable in smaller single crystals which are more affected by the thermal fluctuation. Therefore, in a small recording cell, recording becomes unstable enough to increase noise. This is caused by the reduced number of crystals included in each recording cell and the relative increase of interaction among recording cells.

In order to avoid these problems, patterned media for performing recording/reproducing have been proposed in the field of magnetic recording (for example, see S.Y. Chou et al., J. Appl. Phys., 76 (1994) pp. 6673). In the patterned media, a recording material is segmented in advance by a non-recording material so that each single particle of the recording material is used as a single recording cell.

The method for producing such patterned media includes an artificial drawing method using light or electron beams or a method for producing a recording material out of a self-assembled material such as a diblock polymer or micropar-ticles. According to the former method, high precision and high recording density media can be produced, but it takes more time than according to the latter method. On the other hand, according to the latter method, high-density media can be produced in a short time, but the accuracy deteriorates in comparison with that according to the former method (for example, see JP2001-279616 (kokai)).

When recording/reproducing is performed on a patterned medium, a recording/reproducing head having a recording head and a reproducing head runs on the medium. The recording/reproducing head is positioned using a positioning signal recorded in a servo region on the medium. This positioning allows the recording/reproducing head to gain proper access to each recording dot on the medium and perform recording/reproducing thereon.

A magnetic recording medium having a high recording density data region needs a high-precision servo region. In the aforementioned method for producing a patterned medium using a self-assembled material, the expected recording density of the recording medium is about 200 Gbpsi or higher, and the expected diameter of a recording dot is about 100 nm or smaller. Thus, the positioning accuracy of about 10 nm or lower is required.

However, a dot-shaped (granular) recording material is not suitable for drawing a minute pattern such as a positioning signal in the servo region. In addition, when the servo region is drawn, it is difficult to attain higher positioning accuracy by use of a material as large as the recording material in the data region than that of the recording material. Further, when the self-assembled material is used, there occurs a misalignment or a dimensional divergence in each dot due to fluctuation of the material itself or fluctuation in annealing. Due to the misalignment or the dimensional divergence, existing self-assembled materials are not suitable for the positioning signal in the servo region which signal needs high accuracy. It is therefore desired that the positioning signal in the servo region is created using the artificial drawing method.

The present inventors discovered the following problem in the attempt to mix both the methods in a single substrate in consideration of the aforementioned situation.

That is, according to the existing method for producing a patterned medium using a self-assembled material, it is possible to create a pattern all over the medium, but it is difficult to create a pattern in only a part of the medium or particularly in a region segmented at a minute interval. Therefore, when the self-assembled material is applied after a positioning signal is drawn in the servo region, the servo region attempted to be created by artificial drawing is also covered with the pattern using the self-assembled material. As a result, an unnecessary dot appears in the servo region so that the accuracy of the positioning signal in the servo region deteriorates.

On the other hand, when the positioning signal in the servo region is to be created after the pattern using the self-assembled material is formed in advance, the material of the servo region portion on the substrate must be a material withstanding high temperature in annealing in the process of self-assembling. Such a material is not suitable for artificial drawing in the following process.

According to the existing techniques, it is therefore difficult to manufacture a magnetic recording medium having a high-density data region and a high-precision servo region.

When a recording medium is manufactured with different methods being applied to the servo region and the data region respectively, there occurs a relative misregistration between the two regions. For example, assume that a magnetic recording medium is manufactured by forming the servo region in an artificial drawing method and forming the data region in a method using a self-assembled material. Then, each method is carried out with a predetermined reference point. Since the reference point is fixed to one and the same position on a substrate, positioning is required. The accuracy of this positioning has a limit due to mechanical reproducibility, uneven expansion caused by uneven temperature, mixture of impurities, etc. Thus, there occurs a misregistration between the servo region formed in the artificial drawing method and the data region formed in the method using a self-assembled material.

Examples of positioning methods in the background art include a physical method, an optical method, etc.

In the physical positioning method, each subject is brought into contact with a special guide structure so as to be positioned. However, due to an error caused by the thickness of a layer of the air between the structure and the subject, there is a limit of about 10 μm in the positioning accuracy. On the other hand, in the optical positioning method, optical marks drawn in two subjects are aligned so that they are positioned. However, due to an error caused by the wavelength of light, there is a limit of about 50 nm in the positioning accuracy. Also by use of electron beams, there is a limit of about 15 nm.

In conclusion, the limit of about 10 nm or lower in the positioning accuracy cannot be satisfied in either positioning method. For example, assume that a plurality of different methods as described above are mixed on a single substrate so as to manufacture a recording medium having a high recording density of about 200 Gbpsi or higher. In this case, the relative misregistration occurring among pattern regions cannot be corrected.

SUMMARY OF THE INVENTION

According to a first aspect of the present invention, there is provided an imprint stamper for manufacturing a recording medium including a first transfer region which corresponds to a servo region of a recording medium using a sector servo system and has a pattern with a plurality of quadrilateral recess or protrusion portions formed in a surface thereof, and a second transfer region which corresponds to a data region of the recording medium and has a pattern with a plurality of dots of recess or protrusion portions arrayed like a hexagonal lattice in a surface thereof.

According to a second aspect of the present invention, there is provided an imprint stamper for manufacturing a recording medium including a second transfer region which corresponds to a data region of a recording medium using a sector servo system and has a pattern with a plurality of dots of recess or protrusion portions arrayed in a form of a hexagonal lattice in a surface thereof, a third transfer region which corresponds to a data positioning signal region of the recording medium and has a pattern comprised of a quadrilateral section formed out of a plurality of dot-like recess or protrusion portions arrayed in a form of a hexagonal lattice in a surface thereof and a quadrilateral flat section, and a second non-transfer region which has a flat surface and located in conformity with the servo region of the recording medium.

According to a third aspect of the present invention, there is provided a method to manufacture a magnetic recording medium manufacturing imprint stamper including forming a servo region master imprint stamper corresponding to a magnetic recording medium using a sector servo system so that a mold pattern of quadrilaterals is formed in a first transfer region of a stamper material corresponding to a servo region of the magnetic recording medium by an artificial drawing method, and a flat surface is formed in a first non-transfer region of the stamper material located in conformity with a data region of the magnetic recording medium, forming recess portions in a region of a resist film formed on a substrate while locating the region in conformity with the data region of the magnetic recording medium, filling the recess portions in a surface of the substrate with a self-assembled material, giving a phase-separation to the self-assembled material in the substrate, processing the substrate surface based on the recess portions in the substrate surface so as to form a molded pattern with a plurality of dots arrayed like a hexagonal lattice, transferring the molded pattern to a stamper material to thereby produce a data region master imprint stamper having a mold pattern with a plurality of dots arrayed like a hexagonal lattice in a second transfer region corresponding to the data region of the magnetic recording medium, pairing the servo region master imprint stamper and the data region master imprint stamper with each other, and transferring the mold patterns of the paired master imprint stampers in turn to a master substrate so as to form a master having a molded pattern in a surface thereof, and transferring the molded pattern of the master to a stamper material to thereby form a composite-type medium imprint stamper having a mold pattern.

According to a fourth aspect of the present invention, there is provided a recording medium using a sector servo system including a plurality of servo regions having a plurality of quadrilateral recording materials, and a plurality of data regions formed in regions segmented by the plurality of servo regions, and having a plurality of recording dots arrayed like a hexagonal lattice.

According to a fifth aspect of the present invention, there is provided a method to manufacture a magnetic recording medium including forming a servo region master imprint stamper corresponding to a magnetic recording medium using a sector servo system so that a mold pattern of quadrilaterals is formed in a first transfer region of a stamper material corresponding to a servo region of the magnetic recording medium by an artificial drawing method, and a flat surface is formed in a first non-transfer region of the stamper material located in conformity with a data region of the magnetic recording medium, forming recess portions in a region of a resist film formed on a substrate while locating the region in conformity with the data region of the magnetic recording medium, filling the recess portions in a surface of the substrate with a self-assembled material, giving a phase-separated structure to the self-assembled material in the substrate, processing the substrate surface based on the phase-separated structure of the recess portions in the substrate surface so as to form a molded pattern with a plurality of dots arrayed like a hexagonal lattice, transferring the molded pattern to a stamper material to thereby produce a data region master imprint stamper having a mold pattern with a plurality of dots arrayed like a hexagonal lattice in a second transfer region corresponding to the data region of the magnetic recording medium, pairing the servo region master imprint stamper and the data region master imprint stamper with each other, and transferring the mold patterns of the paired master imprint stampers in turn to a master substrate so as to form a master having a molded pattern in a surface thereof, the surface including a region patterned with a plurality of quadrilaterals and a region patterned with a plurality of dots arrayed like a hexagonal lattice, transferring the molded pattern of the master to a stamper material to thereby form a composite-type medium imprint stamper having a mold pattern, and transferring the mold pattern of the composite-type medium imprint stamper to a magnetic recording medium substrate so as to produce a magnetic recording medium having magnetic recording materials arranged in a molded pattern.

According to a sixth aspect of the present invention, there is provided an information recording/reproducing method including reading a positioning signal in a servo region of a recording medium and a positioning signal in a data region of the recording medium by means of a recording/reproducing head, obtaining relative position information between the servo region and the data region based on the read positioning signal in the servo region and the read positioning signal in the data region, and controlling a position of the recording/reproducing head based on the relative position information so as to record or reproduce information while sweeping a predetermined track of the recording medium.

According to a seventh aspect of the present invention, there is provided an information recording/reproducing apparatus including a recording medium using a sector servo system which includes a plurality of servo regions having a pattern using a plurality of quadrilateral recording materials and a plurality of data regions formed in regions segmented by the plurality of servo regions, each data region including a data recording region having a plurality of recording dots arrayed like a hexagonal lattice, and a data positioning signal region having a pattern comprised of a quadrilateral section formed out of a plurality of recording dots arrayed like a hexagonal lattice and a quadrilateral section having no recording material, a drive unit for driving the recording medium, a recording/reproducing head for sweeping the recording medium, an electronic circuit for processing signals to be inputted/outputted to/from the recording/reproducing head, a unit for calculating relative position information between the servo regions and the data regions based on a positioning signal of the servo region and a positioning signal of the data region read by the recording/reproducing head, and a control unit for controlling a position of the recording/reproducing head on the recording medium based on the relative position information.

Next, the terms used in the aforementioned configurations of the invention will be described.

A "quadrilateral" in the invention is formed out of curves and straight lines. Each curve has a curvature radius not larger than ½ of the short side of the quadrilateral. The curvature radius of the curve near each corner of the quadrilateral depends on the resolution of drawing apparatus for drawing the quadrilateral.

"Servo region imprint stampers" serve to form a servo region of a magnetic recording medium. Of them, one for use in a process for producing a master is referred to as "servo region master imprint stamper", and one for direct use in a process for producing a magnetic recording medium is referred to as "servo region medium imprint stamper". Actually there is no difference between the two as "servo region imprint stampers", but there is a difference in intended use between them.

Likewise, "data region imprint stampers" serve to form a data region of a magnetic recording medium. Of them, one for use in a process for producing a master is referred to as "data region master imprint stamper", and one for direct use in a process for producing a magnetic recording medium is referred to as "data region medium imprint stamper". Actually there is no difference between the two as "data region imprint stampers", but there is a difference in intended use between them.

Further, "composite type imprint stampers" serve to form a servo region and a data region of a magnetic recording medium. Of them, one for direct use in a process for producing a magnetic recording medium is referred to as "composite type medium imprint stamper".

"Non-transfer regions" designate regions which will be brought into contact or non-contact with a subject to be transferred on in a process for transferring the imprint stamper to manufacture a magnetic recording medium, but do not form a recess/protrusion structure in the subject to be transferred on after the transferring process.

A "molded pattern" designates a recess/protrusion structure which is produced partially or wholly in the surface of a magnetic recording medium substrate in a process for transferring the imprint stamper to manufacture a magnetic recording medium. A "mold pattern" is a mold for forming a recess/protrusion structure of the "molded pattern". Recess portions in one of the mold and molded patterns correspond to protrusion portions in the other pattern. The "mold pattern" designates a recess/protrusion structure in a part or the whole of the imprint stamper surface.

Generally, a molded piece means a piece produced by pouring melted metal into a mold, and the mold means a mold to which the melted metal is poured to mold the molded piece. However, transfer performed here and regarded as molding is intended not to form a total shape but to transfer a surface pattern. In addition, the material of the magnetic recording medium substrate regarded as a molded piece is not limited to metal, but materials which will be described later can be used.

In addition, in these terms, the magnetic recording medium as a final product is regarded as a "molded" piece, and the recess/protrusion structure in the surface is defined. Thus, generally a "mold" cannot be produced from a "molded" piece, but in this invention, the "molded pattern" of a master can be transferred to produce a "mold pattern" of a composite type medium imprint stamper.

Effect of the Invention

According to the magnetic recording medium manufacturing imprint stamper according to the first configuration of the invention, a pattern suitable to the servo region and a pattern to the data region can be transferred to a magnetic recording medium in a lump. Accordingly, by use of the composite type imprint stamper, a magnetic recording medium can be manufactured more efficiently.

According to the method for manufacturing a magnetic recording medium manufacturing imprint stamper according to the second configuration of the invention, a master is produced by a servo region master imprint stamper and a data region master imprint stamper, and a composite type medium imprint stamper is produced by use of the master. As a result, the time to produce a magnetic recording medium master having as high recording density and precision as that in the magnetic recording medium according to the sixth configuration of the invention can be shortened on a large scale in comparison with the case where a magnetic recording medium master is produced by an artificial drawing method in the background art.

According to a magnetic recording medium using a sector servo system according to the third configuration of the invention, a magnetic recording medium having a high-recording-density data region and a high-precision servo region can be provided.

According to the method for manufacturing a magnetic recording medium according to the fourth configuration of the invention, the first transfer region corresponding to the servo region and the second transfer region corresponding to the data region can be transferred concurrently due to batch transfer using a composite type medium imprint stamper. Magnetic recording media obtained from one and the same master have relative position information between the first transfer region and the second transfer region. Thus, there is an effect that time to manufacture magnetic recording media can be shortened.

According to the fifth configuration of the invention, in recording/reproducing of a servo region and a data region having relative misregistration, the misregistration is corrected so that recording/reproducing of the recording medium can be achieved with high accuracy and in high recording density.

According to the sixth configuration of the invention, it is possible to provide information recording/reproducing apparatus by which relative misregistration between a high-accuracy servo region and a high-recording-density data region can be corrected based on positioning signals located in the regions.

BRIEF DESCRIPTION OF THE DRAWINGS

The present invention may be more readily described with reference to the accompanying drawings:

FIGS. 8A to 8C are schematic sectional views for explaining the method for manufacturing a composite type medium imprint stamper for manufacturing a magnetic recording medium according to the modification of the third embodiment relating to the third configuration of the invention;

DETAILED DESCRIPTION OF THE INVENTION

Figure 1A:
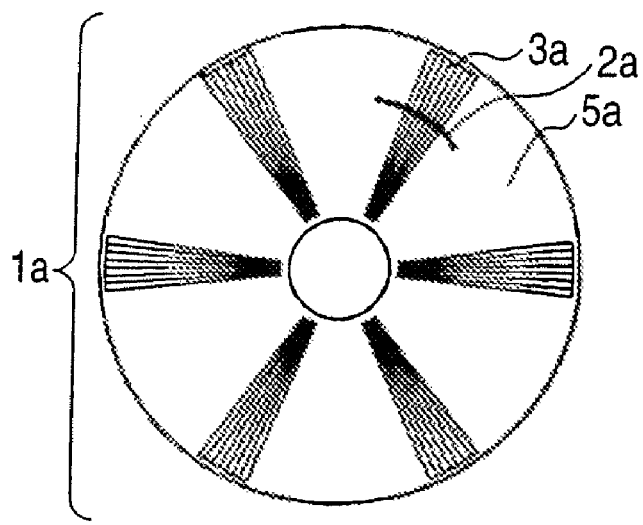
FIGS. 1A to 1C are schematic surface views for explaining imprint stampers according to a first embodiment related to a first configuration of the invention and a second embodiment related to a second configuration of the invention.

Embodiments of the invention will be described below with reference to the drawings. Incidentally, constituent parts shared among the embodiments or examples are denoted by the same reference numerals correspondingly for the sake of omission of duplicate description. The drawings are schematic views for making it easy to explain and understand the invention, so that they may include different portions from those in actual apparatus, as to shape, dimensions, ratios, etc. The design of these portions may be modified suitably in consideration of the following description and known techniques.

In the following embodiments, magnetic recording media are manufactured by forming servo regions in a method using an artificial drawing method and forming data regions in a method using self-assembled materials.

In addition, in the following embodiments, it is assumed that the magnetic recording media are hard disks. However, the invention is not limited thereto.

First Embodiment

A first embodiment related to a magnetic recording medium manufacturing imprint stamper according to the first configuration of the invention will be described below with reference to FIGS. 1A and 1B and FIGS. 2A and 2B.

Figure 1B:
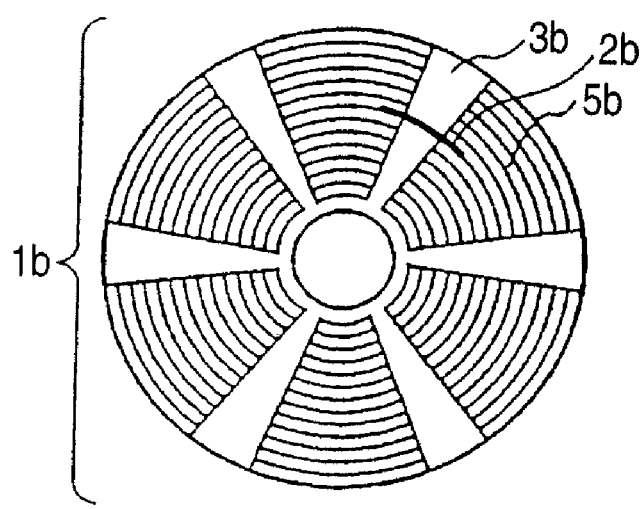
Figure 2A:
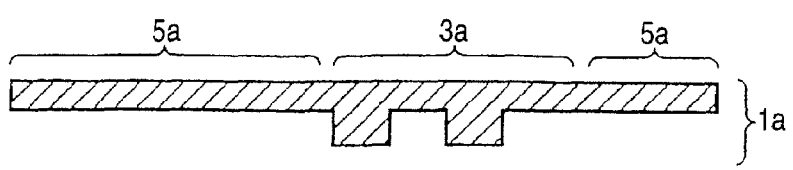
FIGS. 2A to 2C are schematic sectional views for explaining the imprint stampers according to the first embodiment related to the first configuration of the invention and the second embodiment related to the second configuration of the invention.
Figure 2B:
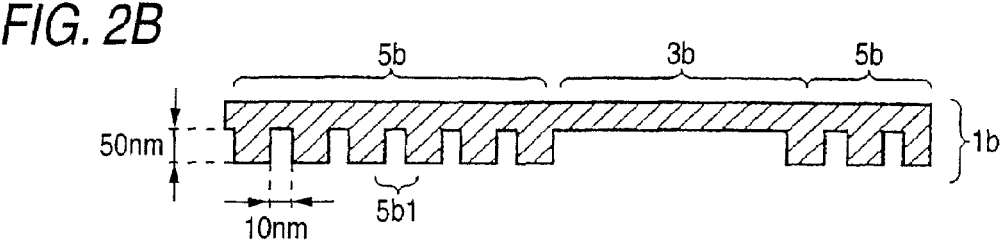

FIG. 1A is a schematic surface view showing a transfer surface of a servo region imprint stamper 1a. FIG. 1B is a schematic surface view showing a transfer surface of a data region imprint stamper 1b to be paired with the servo region imprint stamper 1a depicted in FIG. 1A. FIGS. 2A and 2B are schematic sectional views showing the imprint stampers in which dot-like recess portions 5b1 are portions corresponding to recording dots in a mold pattern. FIG. 2A is a schematic sectional view showing a portion of the servo region imprint stamper 1a designated by the solid line 2a. FIG. 2B is a schematic sectional view showing a portion of the data region imprint stamper 1b designated by the solid line 2b.

Each imprint stamper according to this embodiment is formed into a disc-like shape and for manufacturing a magnetic recording medium using a sector servo system. Accordingly, the magnetic recording medium has data region recording tracks arranged coaxially in the surface of the magnetic recording medium. A servo region including position information (preamble signal, address signal, burst signal, etc.) of recording tracks is formed from the axis side toward the outer edge so as to run across a plurality of corresponding tracks. At least one servo region like this is formed in the magnetic recording medium.

As shown in FIG. 1A, a first transfer region 3a of the servo region imprint stamper 1a corresponding to a servo region of the magnetic recording medium is a radial region running from the axis toward the outer edge. Six regions like this in total are formed on the magnetic recording medium. First non-transfer regions 5a of the servo region imprint stamper 1a located in conformity with data regions of the magnetic recording medium are regions other than the first transfer regions 3a. The first non-transfer regions 5a are radial regions running from the axis to the outer edge.

As shown in FIGS. 1A and 1B, the positional relationship between each second non-transfer region 3b and each second transfer region 5b in the data region imprint stamper 1b corresponds to the positional relationship between each first transfer region 3a and each first non-transfer region 5a in the servo region imprint stamper 1a.

As shown in FIG. 1A, the servo region imprint stamper 1a has first transfer regions 3a corresponding to the servo regions of the magnetic recording medium, and regions 5a located in conformity with the data regions of the magnetic recording medium. On the other hand, as shown in FIG. 1B, the data region imprint stamper 1b has second transfer regions 5b corresponding to the data regions of the magnetic recording medium, and regions 3b located in conformity with the servo regions of the magnetic recording medium.

That is, the first transfer regions 3a of the servo region imprint stamper 1a are located in conformity with the second non-transfer regions 3b of the data region imprint stamper 1b respectively, so that a mold pattern of the first transfer regions 3a is transferred to a partial surface of a magnetic recording medium substrate or the like located in conformity with the first transfer regions 3a and the second non-transfer regions 3b. The mold pattern of the first transfer regions 3a is used for forming a molded pattern of magnetic recording materials in the servo regions of the magnetic recording medium.

In the same manner, the first non-transfer regions 5a of the servo region imprint stamper 1a are located in conformity with the second transfer regions 5b of the data region imprint stamper 1b respectively, so that a mold pattern of the second transfer regions 5b is transferred to a partial surface of the magnetic recording medium substrate located in conformity with the first non-transfer regions 5a and the second transfer regions 5b. The mold pattern of the second transfer regions is used for forming a molded pattern of magnetic recording materials in the data regions of the magnetic recording medium.

Next, description will be made on each region of the servo region imprint stamper 1a.

The pattern of each first transfer region 3a can be formed in an artificial drawing method suitable to the servo region. The first transfer region 3a has a mold pattern constituted by a plurality of recess portions each having a quadrilateral bottom. As shown in FIG. 2A, each recess portion is about 50 nm deep. The quadrilateral shape of the bottom of the recess portion is, for example, assumed to have an area of about $25 \times 43$ nm$^2$ and a curvature radius of 12 nm at each corner in the bottom corresponding to a burst signal.

Figure 2C:
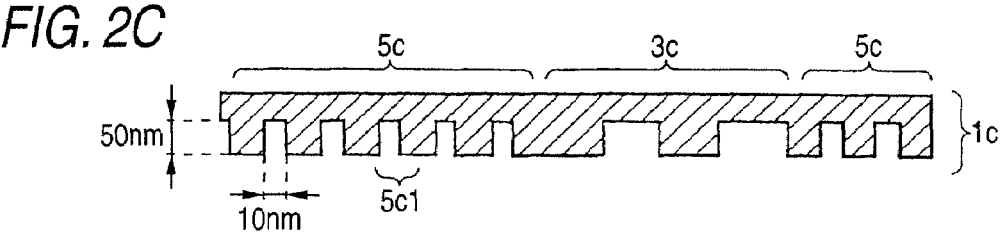

Although only one recess portion appears in the first transfer region 3a shown in FIG. 2A for the sake of convenience, there are a large number of recess portions in the real first transfer region 3a, which recess portions form a mold pattern (the same thing can be applied to FIGS. 3A to 3C, 5A to 5D, 6A to 6C, 7A to 7D, 8A to 8C, 9A, 9B, 10A and 10B which are drawings corresponding to FIGS. 2A to 2C).

Each first non-transfer region 5a of the servo region imprint stamper 1a has a flat surface having no recess/protrusion structure. Due to this characteristic, the first non-transfer region 5a helps the corresponding second transfer region 5b of the data region imprint stamper 1b achieve good transfer to a substrate, which transfer will be described later.

Next, description will be made on each region of the data region imprint stamper 1b.

The pattern of the second transfer region 5b can be formed in a pattern forming method using a self-assembled material suitable to the data region. The second transfer region 5b has a mold pattern constituted by a plurality of dot-like recess portions 5b1 arrayed like a hexagonal lattice corresponding to recording dots. In this embodiment, as shown in FIG. 2B, each dot-like recess portion 5b1 is assumed to have a diameter of about 10 nm in top view, and a depth of about 50 nm. A distance between centers of recording dots 25 adjacent to each other is about 25 nm. Incidentally, the dot-like recess portion 5b1 can have any shape if it is circular in top view. Therefore, though the dot-like recess portion 5b1 is columnar in FIG. 2B, it may have a semispherical shape or the like.

Each second non-transfer region 3b of the data region imprint stamper 1b has a flat surface having no recess/protrusion structure. Due to this characteristic, the second non-transfer region 3b helps the corresponding first transfer region 3a of the servo region imprint stamper 1a achieve good transfer to the substrate.

Incidentally, the surface of an actual magnetic recording medium imprint stamper having a diameter of about 6.5 cm may not have a perfectly flat surface but have a gentle curved surface having an error up to about 1 µm in height. At the time of transfer, the substrate comes in close contact with the curved surface so as to follow it. The height of the curved surface is several tens of times as large as the depth about 50 nm of each recess portion of the pattern in the first transfer region 3a and the second transfer region 5b. However, the height of the curved surface has such a gentle change that the height does not exert a strong influence on the transfer of the recess/protrusion structure. In addition, it is highly likely that each "flat surface" of the first non-transfer region 5a and the second non-transfer region 3b is not a perfect flat surface but such a curved surface.

Next, description will be made on the materials of the servo region imprint stamper 1a and the data region imprint stamper 1b.

Each of the materials of the servo region master imprint stamper 1a and the data region master imprint stamper 1b needs to satisfy the following conditions, that is, the condition of being a material capable of being etched in a method for manufacturing an imprint stamper according to a third embodiment, and the condition of being harder than a resist film 8 formed on a master substrate in a method for manufacturing a magnetic recording medium according to a fourth embodiment. Specifically, examples of the materials include metals, alloys, metal oxides, ceramic materials, inorganic materials such as glass, semiconductors, or mixtures of these materials. Particularly nickel (Ni), aluminum (Al), silicon (Si), silicon carbide (SiC), glass, quartz, diamond, etc. are preferred.

Each of the materials of the servo region medium imprint stamper 1a and the data region medium imprint stamper 1b needs to satisfy the following conditions, that is, the condition of being a material capable of being etched in the method for manufacturing an imprint stamper according to the third embodiment, and the condition of being harder than a resist film 9 formed on a magnetic recording medium substrate in a method for manufacturing a magnetic recording medium according to a fifth embodiment. Specific examples of the materials are similar to those of the servo region master imprint stamper 1a and the data region master imprint stamper 1b for use in a master producing process.

A modification of the first embodiment will be described below.

As for an imprint stamper according to this embodiment, a modification in which portions corresponding to recording dots in a mold pattern of the imprint stamper are protrusion portions will be described with reference to FIGS. 3A and 3B.

Figure 3A:
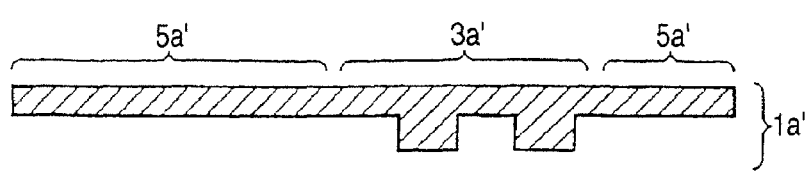
FIGS. 3A to 3C are schematic sectional views for explaining the imprint stampers according to modifications of the first embodiment related to the first configuration of the invention and the second embodiment related to the second configuration of the invention.
Figure 3B:
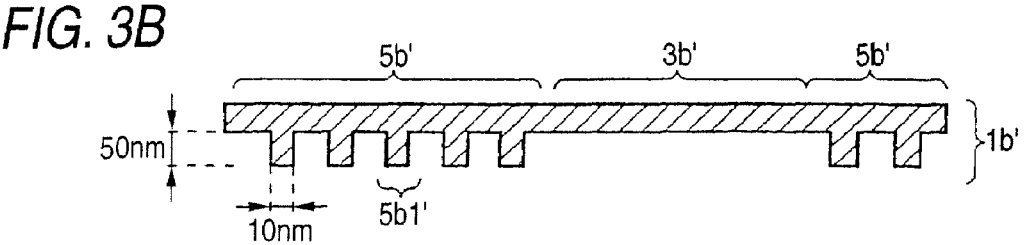

FIGS. 3A and 3B are schematic sectional views showing the imprint stamper in which portions corresponding to recording dots in the mold pattern are dot-like protrusion portions 5b1'. FIG. 3A is a schematic sectional view showing the portion of the servo region imprint stamper 1a designated by the solid line 2a. FIG. 3B is a schematic sectional view showing the portion of the data region imprint stamper 1b designated by the solid line 2b.

This modification is the same as the aforementioned embodiment, except that the recess portions in the first transfer regions 3a of the servo region imprint stamper 1a and the second transfer regions 5b of the data region imprint stamper 1b are replaced by protrusion portions. Description will be made below chiefly on the different point.

As shown in FIG. 3A, each first transfer region 3a' of a servo region imprint stamper 1a' has a mold pattern constituted by a plurality of protrusion portions each having a quadrilateral head and having a height of about 50 nm. As shown in FIG. 3B, each second transfer region 5b' of a data region imprint stamper 1b' has a mold pattern constituted by a plurality of dot-like protrusion portions 5b1' arrayed like a hexagonal lattice correspondingly to recording dots. In this embodiment, each dot-like protrusion portion 5b1' is assumed to have a diameter of about 10 nm in top view, and a height of about 50 nm. A distance between centers of recording dots 25 adjacent to each other is about 25 nm. Incidentally, the dot-like protrusion portion 5b1' can have any shape if it is circular in top view. Therefore, though the dot-like protrusion portion 5b1' is columnar in FIG. 3B, it may have a semispherical shape or the like.

In such a manner, the first transfer regions 3a, 3a' corresponding to the servo regions of a magnetic recording medium and the second transfer regions 5b, 5b' corresponding to the data regions of the magnetic recording medium are produced by different imprint stampers. According to this embodiment, in the first transfer regions 3a, 3a' of the servo region imprint stamper, there is no unnecessary dot which might appear in the background art. Accordingly, by use of the servo region imprint stamper 1a, 1a' and the data region imprint stamper 1b, 1b' paired with each other, it is possible to produce a magnetic recording medium having higher-precision servo regions.

Second Embodiment

A second embodiment related to a magnetic recording medium manufacturing imprint stamper according to the second configuration of the invention will be described below with reference to FIGS. 1C and 2C.

Figure 1C:
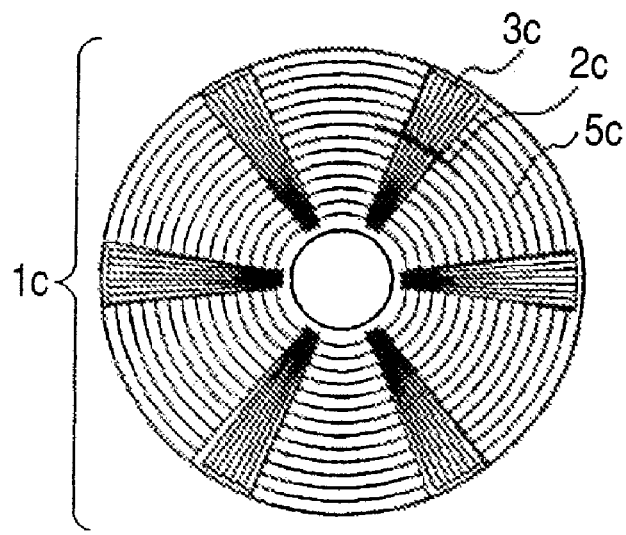

FIG. 1C is a schematic surface view showing a transfer surface of a composite type imprint stamper 1c. FIG. 2C is a schematic sectional view corresponding to FIGS. 2A and 2B, and showing a portion of the composite type imprint stamper 1c designated by the solid line 2c when portions 5b1 corresponding to recording dots in a mold pattern are recess portions.

As shown in FIG. 1C, the composite type imprint stamper 1c is formed into a disc-like shape and for manufacturing a magnetic recording medium using a sector servo system. Accordingly, as shown in FIG. 1C, first transfer regions 3c corresponding to servo regions of a magnetic recording medium are radial regions running from the axis toward the outer edge. First non-transfer regions 5c corresponding to data regions of the magnetic recording medium are regions other than the first transfer regions 3c. The first non-transfer regions 5c are radial regions running from the axis to the outer edge.

The composite type imprint stamper 1c is obtained as follows. That is, the mold patterns of the data region master imprint stamper 1b and the servo region master imprint stamper 1a according to the first embodiment are transferred in turn onto a master substrate so as to form a master. The molded pattern of the master is further transferred to obtain the composite type imprint stamper 1c.

Accordingly, as shown in FIGS. 1A and 1C, the positional relationship between each first transfer region 3c and each second transfer region 5c in the composite type imprint stamper 1c is similar to the positional relationship between each first transfer region 3a and each first non-transfer region 5a in the servo region imprint stamper 1a.

In addition, each first transfer region 3c of the composite imprint stamper 1c corresponds to each first transfer region 3a of the servo region imprint stamper 1a, and each second transfer region 5c corresponds to each second transfer region 5b of the data region imprint stamper 1b.

That is, a mold pattern of the first transfer regions 3c of the composite type imprint stamper 1c is transferred to a partial surface of a magnetic recording medium substrate located in conformity with the first transfer regions 3c. The mold pattern of the first transfer regions 3c is used for forming a molded pattern of magnetic recording materials in the servo regions of the magnetic recording medium. In addition, a mold pattern of the second transfer regions 5c of the composite type imprint stamper 1c is transferred to a partial surface of the magnetic recording medium substrate located in conformity with the second transfer regions 5c. The mold pattern of the second transfer regions 5c is used for forming a molded pattern of magnetic recording materials in the data regions of the magnetic recording medium.

The mold patterns of the first transfer regions 3c and the second transfer regions 5c are similar to the aforementioned ones. That is, each first transfer region 3c is constituted by a plurality of recess portions each having a quadrilateral bottom. Each second transfer region 5c is constituted by a plurality of dot-like recess portions arrayed like a hexagonal lattice.

Incidentally, the material of the composite type imprint stamper 1c is similar to those of the servo region imprint stamper 1a and the data region imprint stamper 1b.

Two modifications of the second embodiment will be described below.

A first modification about an imprint stamper according to this embodiment will be described with reference to FIG. 3C, in which portions of the mold pattern of the imprint stamper corresponding to recording dots are protrusion portions.

Figure 3C:
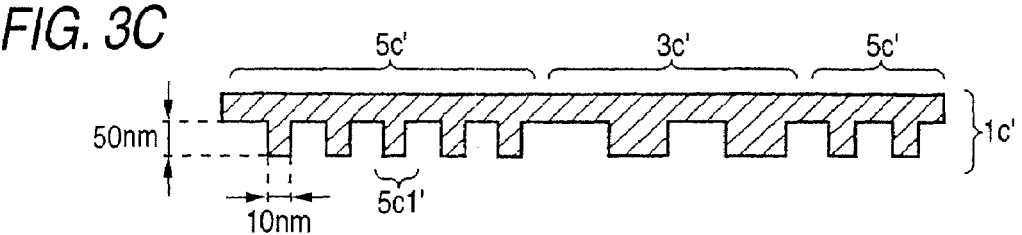

FIG. 3C is a schematic sectional view corresponding to FIGS. 3A and 3B and showing a portion designated by the solid line 2c in a composite type imprint stamper 1c in which portions 5c1' corresponding to recording dots in the mold pattern are protrusion portions.

This modification is the same as the aforementioned embodiment, except that the recess portions in the first transfer regions 3c and the second transfer regions 5c of the composite type imprint stamper 1c are replaced by protrusion portions. That is, as shown in FIG. 3C, each first transfer region 3c' of a composite type imprint stamper 1c' has a pattern constituted by a plurality of protrusion portions each having a quadrilateral head and having a height of about 50 nm. Each second transfer region 5c' is constituted by a plurality of dot-like protrusion portions 5c1' arrayed like a hexagonal lattice correspondingly to recording dots. In this embodiment, each dot-like protrusion portion 5c1' is assumed to have a diameter of about 10 nm in top view, and a height of about 50 nm. A distance between centers of recording dots 25 adjacent to each other is about 25 nm. Incidentally, the dot-like protrusion portion 5c1' can have any shape if it is circular in top view. Therefore, though the dot-like protrusion portion 5c1' is columnar in FIG. 3C, it may have a semispherical shape or the like.

A second modification will be described.

The magnetic recording medium manufacturing imprint stamper according to the second configuration of the invention is not limited to the one for producing a disc-like magnetic recording medium as shown in FIGS. 1A to 1C. A modification in which the shape of the magnetic recording medium is quadrilateral will be described with reference to FIG. 4.

Figure 4:
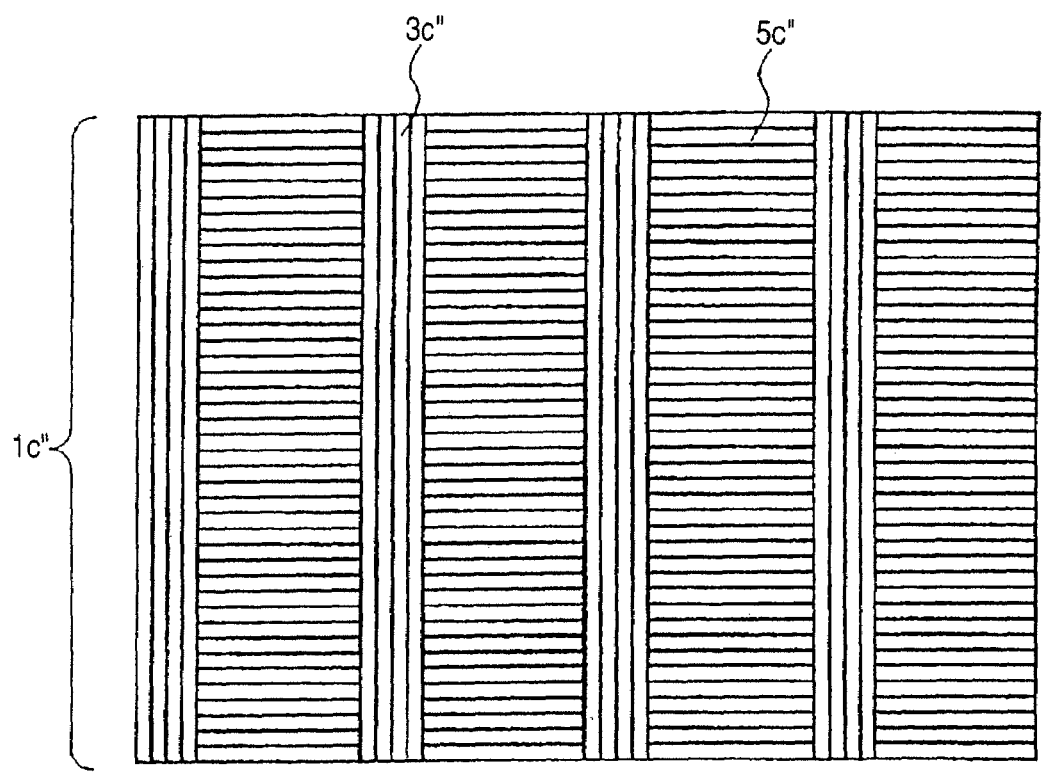
FIG. 4 is a schematic surface view for explaining the modification of the second embodiment related to the second configuration of the invention.

FIG. 4 is a schematic surface view for explaining an imprint stamper according to this modification. A magnetic recording medium corresponding to this composite type imprint stamper 1c" is of a sector servo system and has a quadrilateral shape. Recording tracks extend in the longitudinal direction of the magnetic recording medium so as to be arranged in parallel with each other, and each servo region is formed to extend over a plurality of recording tracks. Thus, as shown in FIG. 4, first transfer regions 3c" corresponding to the servo regions in the magnetic recording medium manufacturing medium imprint stamper are formed to extend over all the tracks and at a predetermined interval in the running direction of a magnetic head, in the longitudinal direction of the recording tracks. In FIG. 4, the first transfer regions 3c" are provided to cross the track direction at right angles. Second transfer regions 5c" are regions other than the first transfer regions 3c".

By use of the composite type imprint stamper 1c according to this embodiment, the first transfer regions 3c and the second transfer regions 5c can be transferred all at once. Accordingly, when magnetic recording media are manufactured, to use one composite type imprint stamper 1c is more efficient than to use two imprint stampers, that is, the servo region imprint stamper 1a and the data region imprint stamper 1b.

When magnetic recording media are manufactured by use of imprint stampers, it is generally difficult to perform transfer always in a fixed position, so that there occurs misregistration in a transfer process. In this invention, there occurs relative misregistration between servo regions and data regions in the process of sequential transfer with the servo region imprint stamper 1a and the data region imprint stamper 1b. Accordingly, when the servo region medium imprint stamper 1a and the data region medium imprint stamper 1b are used in the process for forming magnetic recording media, the relative misregistration between servo regions and data regions in one magnetic recording medium differs from that in another. It is therefore necessary to acquire relative misregistration information about all the magnetic recording media.

On the other hand, in this embodiment, the servo region master imprint stamper 1a and the data region master imprint stamper 1b are used in the process for producing a master. After that, the master is manufactured, and the composite type medium imprint stamper 1c is then manufactured. In this event, all the magnetic recording media coming from the same master have identical relative misregistration information. Accordingly, when magnetic recording media are manufactured using the composite type medium imprint stamper 1c, once information about misregistration between servo regions and data regions of a magnetic recording medium is acquired, the misregistration information can be used for all the magnetic recording media coming from the same master. In the existing circumstances, it is believed that about 100 imprint stampers can be produced from one master, and about 100,000 magnetic recording media can be produced from one imprint stamper. Accordingly, if misregistration information of one magnetic recording medium produced by use of the composite type imprint stamper 1c is acquired, misregistration information of about 10,000,000 magnetic recording media can be obtained. Incidentally, these effects can be obtained also in each modification in the same manner.

Third Embodiment

A third embodiment related to a method for manufacturing a magnetic recording medium manufacturing imprint stamper according to the third configuration of the invention will be described below with reference to FIGS. 5A to 5D, 6A to 6C, 7A to 7D and 8A to 8C.

This embodiment will be described along the method for manufacturing an imprint stamper according to the second embodiment, by way of example. In addition, the composite type medium imprint stamper 1c in the second embodiment is manufactured by use of the servo region master imprint stamper 1a and the data region master imprint stamper 1b in the first embodiment.

First, a method for manufacturing a master imprint stamper will be described using the servo region master imprint stamper 1a and the data region master imprint stamper 1b by way of example.

The servo region master imprint stamper 1a is formed as follows. That is, the surface of a stamper material is coated with a resist film. A pattern is drawn in the resist film in an artificial drawing method. The surface of the stamper material is etched with the resist film as a mask. Examples of such artificial drawing methods include a light drawing method, an electron beam drawing method, an FIB (Focused Ion Beam) drawing method, an X-ray drawing method, an EUV (Extreme UltraViolet) drawing method, a near-field drawing method, etc.

The data region master imprint stamper 1b is produced in a method using a self-assembled material 13. A method for manufacturing the data region master imprint stamper 1b according to this embodiment will be described with reference to FIGS. 5A, 5B, 5C and 5D.

Figure 5A:
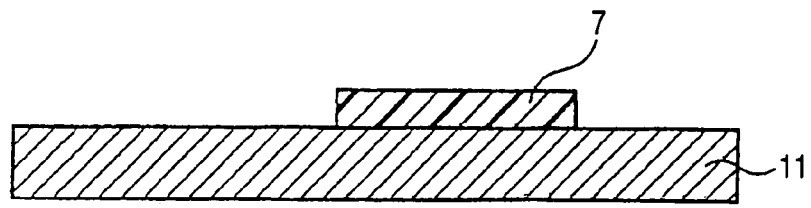
FIGS. 5A to 5D are schematic sectional views for explaining a method for manufacturing a data region imprint stamper for manufacturing a master according to a third embodiment relating to a third configuration of the invention.
Figure 5B:
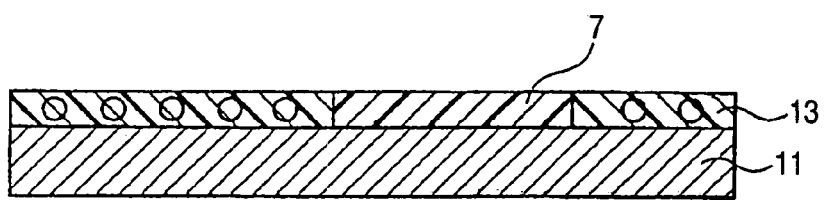
Figure 5C:
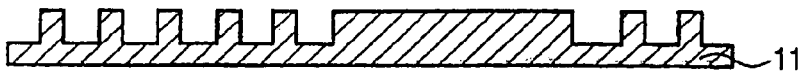
Figure 5D:
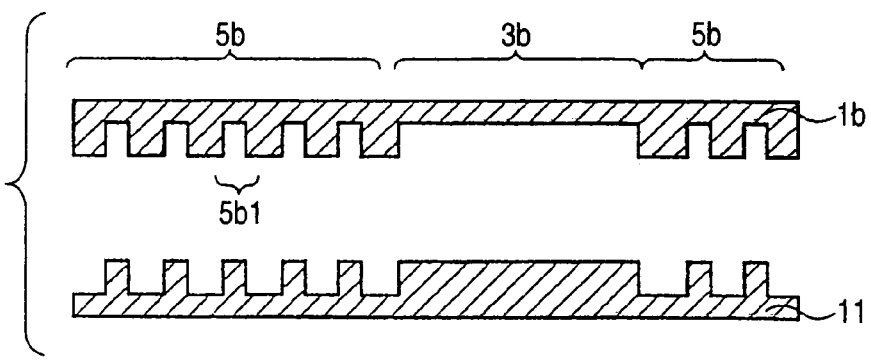

FIG. 5A is a schematic sectional view for explaining a process for forming a resist film on a data region imprint stamper substrate 11 and then forming a resist film 7 in a region corresponding to a servo region of the aforementioned magnetic recording medium and a recess portion adjacent to the resist film 7. FIG. 5B is a schematic sectional view for explaining a process for filling the recess portion in the substrate surface with the self-assembled material 13 and performing annealing for phase-separating the self-assembled material 13. FIG. 5C is a schematic sectional view for explaining a process for processing the substrate surface based on the phase-separated structure of the recess portion in the substrate surface to thereby form a molded pattern of a plurality of dots arrayed like a hexagonal lattice. FIG. 5D is a schematic sectional view for explaining a process for transferring the molded pattern to a stamper material to thereby form a data region master imprint stamper having a mold pattern of a plurality of dots arrayed like a hexagonal lattice in each second transfer region corresponding to each data region of the magnetic recording medium.

First, as shown in FIG. 5A, a resist film is formed on the data region imprint stamper producing substrate 11 by a spin coat method or the like, and the resist film 7 and the recess portion adjacent thereto are formed by drawing in an artificial drawing method and etching. In the transfer process of FIG. 5D, the resist film 7 on the substrate 11 will be a region for forming the second non-transfer region 3*b* of the data region master imprint stamper 1*b*, and the recess portion on the substrate 11 will be a region located in conformity with the second transfer region 5*b* of the data region master imprint stamper 1*b*. Incidentally, the resist film 7 and the recess portion can be also formed by an imprint method. When the imprint method is used, a resist residue occurs in the bottom of the recess portion so that the substrate is not exposed.

In this embodiment, it is assumed that the diameter of each recording dot is about 10 nm, and a distance between centers of recording dots 25 adjacent to each other is about 25 nm. Thus, the resist film is about 70 nm thick. Novolak type resist is used as the resist film. A material capable of being etched in the process of FIG. 5C which will be described later can be used as the material of the data region imprint stamper producing substrate 11. As the material, Si, glass or quartz is preferred.

Next, as shown in FIG. 5B, the recess portion formed in the surface of the substrate 11 in FIG. 5A is filled with the self-assembled material 13, and phase separation is performed on the self-assembled material 13. The phase-separated structure in this process is comprised of dot portions (○ in FIG. 5B) arrayed like a hexagonal lattice, and matrix portions surrounding the dot portions.

In this embodiment, it is assumed that a PS (polystyrene)— PMMA (polymethylmethacrylate) diblock copolymer is used as the self-assembled material 13. The molecular weight ratio of PS to PMMA in this PS-PMMA diblock copolymer is 25% to 75%. In this event, the phase-separated structure takes a micellar structure, in which PS low in etching rate forms the dot portions and PMMA high in etching rate forms the matrix portions. The PS-PMMA diblock copolymer is dissolved in a suitable solvent such as toluene so as to form a film. After that, annealing is performed at a temperature not lower than the glass transition point of the PS-PMMA diblock copolymer so as to obtain a phase-separated structure. In this case, for example, phase separation occurs at about 160° C. in about 10 hours under a nitrogen atmosphere.

Next, as shown in FIG. 5C, a molded pattern is formed on the substrate 11 by etching based on the obtained phase-separated structure. In this process, the dot portions arrayed like a hexagonal lattice become protrusion portions while the matrix portions are removed from the substrate 11. The etching in this process is performed by RIE (Reactive Ion Etching) using oxygen ions in the atmosphere at about −20° C. and about 2 mTorr with an electric field of about 100 W applied thereto. In this event, RIE using $CF_4$ as etchant may be used.

Finally, as shown in FIG. 5D, Ni electroforming or the like is performed to transfer the molded pattern obtained on the substrate 11 in FIG. 5C. Thus, a mold pattern is formed on the data region master imprint stamper 1*b* made of Ni. Incidentally, in this mold pattern, dot-like recess portions 5*b*1 correspond to recording dots of a magnetic recording medium.

Next, description will be made on the material of the self-assembled material 13 when the data region master imprint stamper 1*b* is manufactured.

Besides the aforementioned material, particulates made of a block copolymer, a polymer, a metal, etc. and having a particle size of several tens of nanometers may be used as the self-assembled material 13.

When a block copolymer is used as the self-assembled material 13, molecules having a component ratio to form a micellar structure or a cylindrical structure in the substrate surface is used. Due to such a structure, a recording cell structure of dot-like recording cells separated from one another and arrayed regularly like a hexagonal lattice can be formed in a recording layer. Here, there is required a combination of polymers in which blocks forming the micellar structure or the cylindrical structure have high etching resistance or only the blocks forming the micellar structure or the cylindrical structure survive after a developing process. For example, when a block copolymer consisting of PS and polybutadiene is used, a developing process can be performed so that only PS blocks survive after ozonation.

When particulates made of a polymer, a metal, etc. and having a particle size of several tens of nanometers are used as the self-assembled material 13, dispersion containing the particulates is developed from above the substrate 11 and dried to remove the solvent. After that, particulates adsorbed excessively are removed by a suitable solvent. Thus, a self-assembled regular array can be produced. Alternatively, a medium substrate may be dipped in dispersion, in which particulates have been dispersed, for a certain time so that the particulates are adsorbed in the substrate 11. Thus, a regular array can be formed.

Next, a method for manufacturing a medium imprint stamper will be described along the method for manufacturing the composite type medium imprint stamper 1*c* according to the second embodiment by way of example. FIGS. 6A, 6B, 6C and 6D are schematic sectional views for explaining the method for manufacturing the composite type medium imprint stamper 1*c*.

Figure 6A:
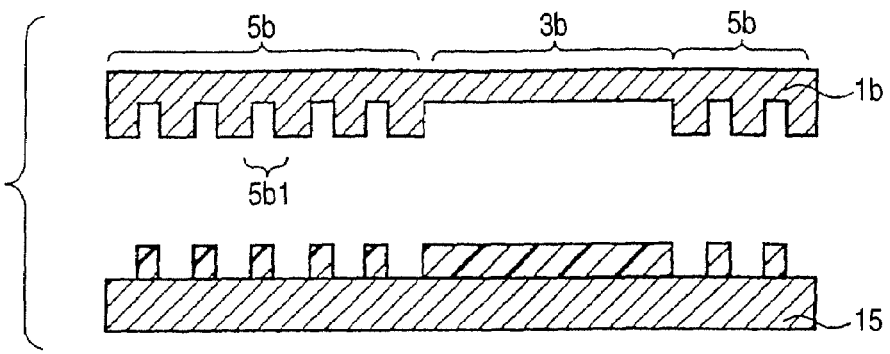
FIGS. 6A to 6C are schematic sectional views for explaining a method for manufacturing a composite type medium imprint stamper for manufacturing a magnetic recording medium according to the third embodiment relating to the third configuration of the invention.
Figure 6B:
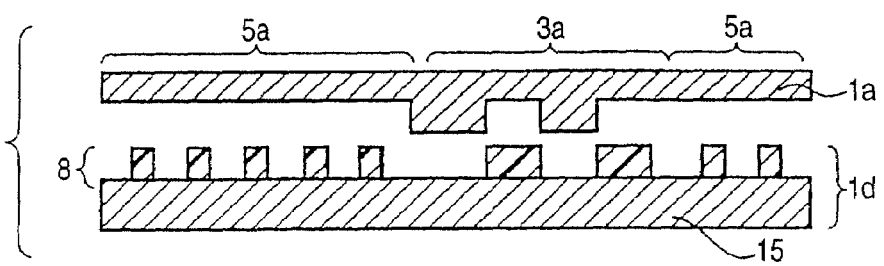
Figure 6C:
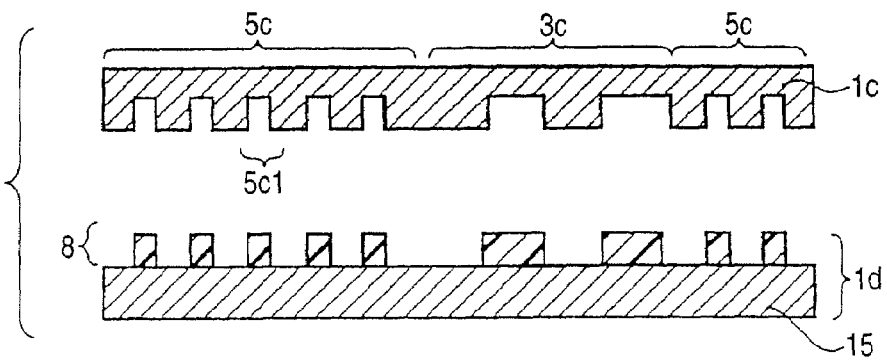

FIG. 6A is a schematic sectional view for explaining a process for transferring the data region master imprint stamper 1*b* so as to form a molded pattern in regions corresponding to the second transfer regions in the resist film formed on a master substrate 15. FIG. 6B is a schematic sectional view for explaining a process for transferring the first transfer regions of the servo region master imprint stamper 1*a* so as to form a molded pattern on the master substrate 15. FIG. 6C is a schematic sectional view for explaining a process for transferring the molded pattern of the master to a stamper material so as to produce a composite type medium imprint stamper 1*c* having a mold pattern.

First, as shown in FIG. 6A, a resist film is formed on the master substrate 15 by a spin coat method or the like. After that, a mold pattern of the second transfer regions 5*b* is transferred to the resist film by use of the data region master imprint stamper 1*b*. Thus, a resist film having a molded pattern in regions of the resist film corresponding to the second transfer regions 5*b* is formed. In this event, in the resist film, each of the regions corresponding to the second transfer regions 5*b* has a molded pattern constituted by a hexagonal lattice array of dot-like protrusion portions, while each of the regions located in conformity with the second non-transfer regions are flat. Novolak type resist is used as the resist film, and the thickness thereof is about 70 nm. As the material of the master substrate 15, Si, glass or quartz is preferred.

Next, as shown in FIG. 6B, the mold pattern of the first transfer regions 3*a* is transferred to the resist film surface by use of the servo region master imprint stamper 1*a*. Thus, a resist film 8 having a molded pattern is formed.

Finally, as shown in FIG. 6C, Ni electroforming or the like is performed on a master 1*d* obtained in FIG. 6B, so as to produce a composite type medium imprint stamper 1*c*. Incidentally, it is preferable that a process for performing UV irradiation on the master 1*d* to thereby photo-cure the resist film 8 on the master 1*d* is performed prior to the process shown in FIG. 6C.

Due to the processes of FIGS. 6A and 6B, the molded pattern of the first transfer regions 3*a* using the servo region master imprint stamper 1*a* and the molded pattern of the second transfer regions 5*b* using the data region master imprint stamper 1*b* are formed in the resist film 8 on the surface of the master substrate 15. Thus, the master 1*d* is completed. Incidentally, the order in which the data region master imprint stamper 1*b* and the servo region master imprint stamper 1*a* are transferred may be reversed.

In addition, the data region master imprint stamper 1*b* and the servo region master imprint stamper 1*a* are positioned to prevent misregistration from occurring when they are transferred in the processes of FIGS. 6A and 6B. As for the positioning method, a physical method, an optical method, etc. may be used. In the physically positioning method, each subject is brought into contact with a special guide structure so as to be positioned. In the optically positioning method, optical marks drawn in two subjects are aligned so that they are positioned.

A modification of the third embodiment will be described below.

In this modification, portions corresponding to recording dots in a mold pattern of an imprint stamper are formed as protrusion portions. In the third embodiment, the imprint stamper shown in FIGS. 2A to 2C has been described with reference to FIGS. 5A to 5D and 6A to 6C by way of example. In this modification, however, the imprint stamper shown in FIGS. 3A to 3C will be described with reference to FIGS. 7A to 7D and 8A to 8C by way of example.

FIGS. 7A to 7D are views for explaining a method for manufacturing a data region master imprint stamper 1*b*' according to this modification. FIGS. 7A to 7D are contrasted with FIGS. 5A to 5D in the kind of the self-assembled material 13 and the shape of the data region imprint stamper 1*b*' having a mold pattern. The points of difference from FIGS. 5A to 5D will be described below.

Figure 7A:
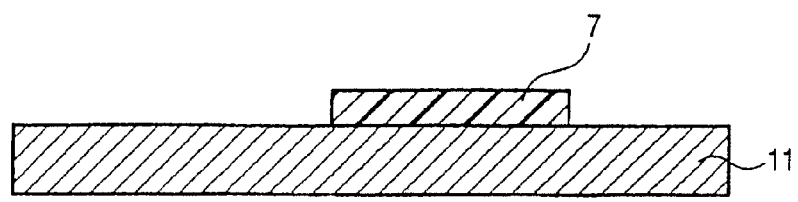
FIGS. 7A to 7D are schematic sectional views for explaining a method for manufacturing a data region imprint stamper for manufacturing a master according to a modification of the third embodiment relating to the third configuration of the invention.
Figure 7B:
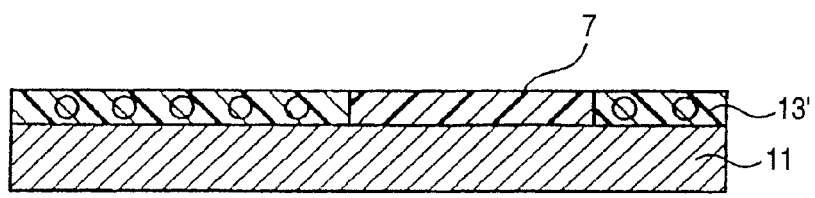

The molecular weight ratio of PS to PMMA in a PS-PMMA diblock copolymer used in FIG. 7B is 75% to 25%. In the phase-separated structure with this molecular weight ratio, PS low in etching rate forms matrix portions and PMMA high in etching rate forms dot portions.

Figure 7C:

FIG. 7C shows a process in which the obtained phase-separated structure is etched or developed to create a molded pattern on a substrate 11. In this modification, the dot portions arrayed like a hexagonal lattice are removed from the substrate 11 so that the matrix portions become protrusion portions.

Figure 7D:
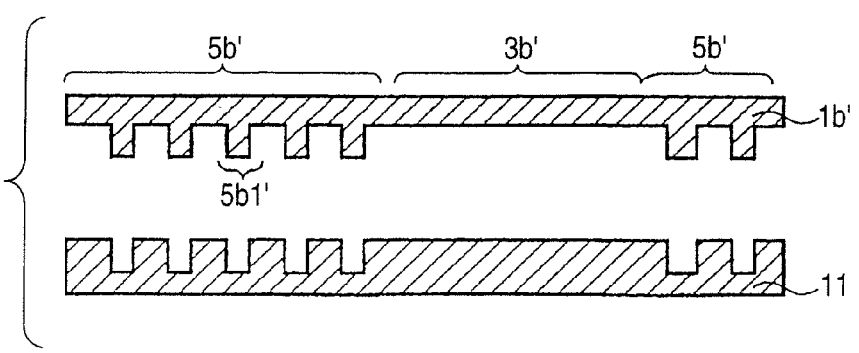

In FIG. 7D, Ni electroforming or the like is performed on the surface of the substrate 11 obtained in FIG. 7C, so as to transfer the molded pattern obtained on the substrate 11 in FIG. 7C. Thus, a mold pattern is formed on the data region master imprint stamper 1*b*' made of Ni. Although dot-like recess portions 5*b*1 in the mold pattern correspond to recording dots in FIG. 5D, dot-like protrusion portions 5*b*1' in the mold pattern correspond to recording dots in FIG. 7D.

FIGS. 8A to 8C are views for explaining the method for manufacturing a composite type medium imprint stamper 1*c*' according to this modification. There is no difference between the manufacturing method in FIGS. 8A to 8C and the manufacturing method in FIGS. 6A to 6C. However, FIGS. 8A to 8C are contrasted with FIGS. 6A to 6C in the shape of each imprint stamper having a mold pattern and the shape of a resist film 8' having a molded pattern. The points of difference from FIGS. 6A to 6C will be described below.

As shown in FIG. 8A, portions corresponding to recording dots in the data region master imprint stamper 1*b*' are dot-like protrusion portions 5*b*1'. As shown in FIG. 8B, each first transfer region 3*a*' of the servo region master imprint stamper 1*a*' is constituted by a plurality of protrusion portions each having a quadrilateral head. As shown in FIG. 8C, portions corresponding to recording dots in the composite type medium imprint stamper 1*c*' are dot-like protrusion portions 5*c*1'.

As described above, according to this embodiment, a master 1*d* is produced by use of the servo region master imprint stamper 1*a* and the data region master imprint stamper 1*b*, and transferred to produce the composite type medium imprint stamper 1*c*. To obtain a magnetic recording medium whose recording density is as high as that in the sixth embodiment, it takes about 100 hours to produce one master 1*d* when all the regions thereof are drawn by electron beam lithography. On the other hand, according to this embodiment, one master 1*d* can be produced in about 15 hours.

In the existing circumstances, as described above, it is believed that about 100 imprint stampers can be produced from one master 1*d*, and about 100,000 magnetic recording media can be produced from one imprint stamper. Here, assume that it takes about 10 minutes to manufacture a composite type medium imprint stamper 1*c* from a master 1*d*, and the throughput in transferring from one composite type medium imprint stamper 1*c* onto magnetic recording media is about 3 seconds per magnetic recording medium. Then, it takes about 300,000 seconds, that is, about 83 hours to produce about 100,000 magnetic recording media from one master 1*d*. In this event, assume that there is one production line of masters 1*d*, and there are 100 lines for a process of manufacturing magnetic recording media from composite type medium imprint stampers 1*c*. In the background-art method, it takes about 100 hours to produce a master so that there occur non-operating lines. In this embodiment, however, it takes only about 15 hours to produce a master. Therefore, there occurs no non-operating line. Further, since it takes a short time to produce a master, the price of the master can be reduced on a large scale. Incidentally, these effects can be applied to the modification.

Fourth Embodiment

Figure 9A:
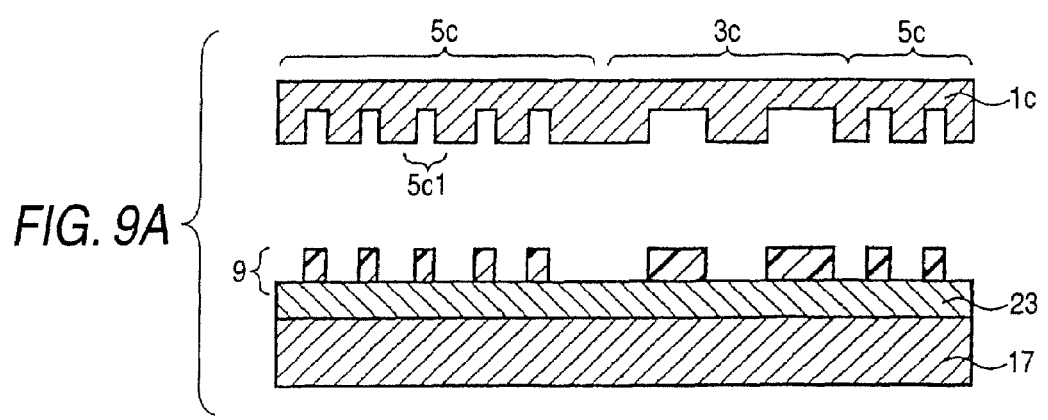
FIGS. 9A and 9B are schematic sectional views for explaining a method for manufacturing a magnetic recording medium according to a fourth embodiment related to a fourth configuration of the invention.
Figure 9B:
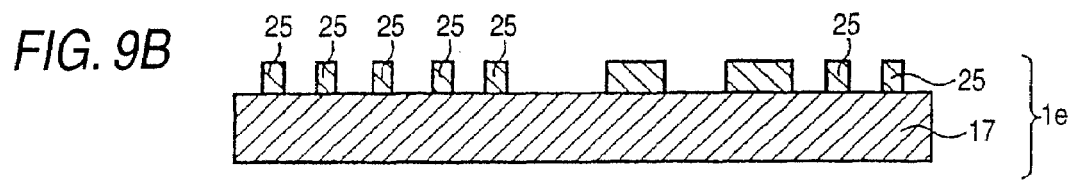

Description will be made below on a method for manufacturing a magnetic recording medium according to the fourth configuration of the invention. With reference to FIGS. 9A and 9B, this embodiment will be described along the method for manufacturing a magnetic recording medium using an imprint stamper according to the second embodiment, by way of example.

FIG. 9A is a schematic sectional view for explaining a process for forming a resist film on a magnetic recording medium substrate 17 having a magnetic layer 23, and transferring a mold pattern of a composite type medium imprint stamper 1*c* to the resist film. FIG. 9B is a schematic sectional view for explaining a process for processing a magnetic material with a resist film 9 as a mask, the resist film 9 being formed in FIG. 9A so as to draw a molded pattern.

First, as shown in FIG. 9A, a resist film is formed on the magnetic recording medium substrate 17 having a magnetic layer 23 formed on its surface by use of a spin coat method or the like. After that, the mold pattern of the composite type medium imprint stamper 1c is transferred to the resist film. Thus, the resist film 9 having a molded pattern is formed.

Next, in FIG. 9B, the magnetic layer 23 is etched in a magnetic material processing process, such as Ar trimming, with the molded pattern of the surface resist layer 9 as a mask so as to form recording dots 25 of a magnetic recording medium 1e. The Ar trimming is performed on the conditions of an Ar partial pressure of $2.5 \times 10^{-4}$ Torr and a voltage of 1,000 V. Incidentally, matrix portions of the recording dots 25 may be filled with a material such as $SiO_2$, carbon, alumina, polymer such as PMMA or PS, lubricating oil, or the like.

As a result, there is obtained a recording medium in which the diameter of each recording dot 25 is about 10 nm, the distance between centers of the recording dots 25 adjacent to each other is about 25 nm, the positioning accuracy of servo regions 3e is 2 nm, and the recording density is 800 Gbpsi.

A modification of the fourth embodiment will be described below.

Figure 10A:
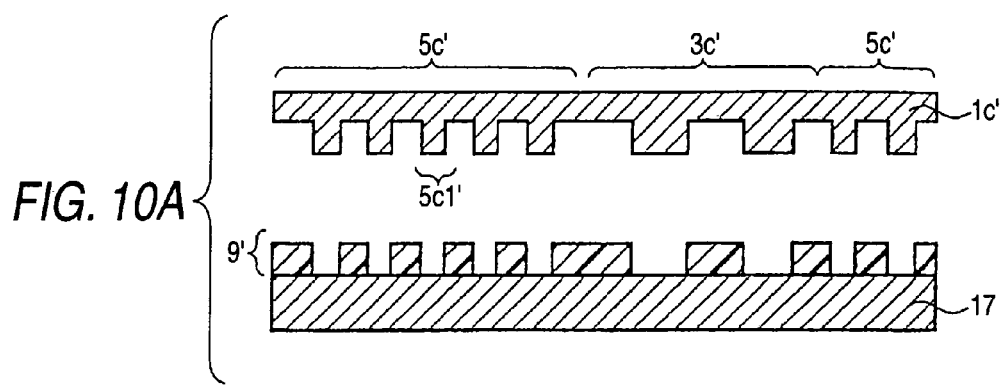
FIGS. 10A and 10B are schematic sectional views for explaining a method for manufacturing a magnetic recording medium according to a modification of the fourth embodiment related to the fourth configuration of the invention.
Figure 10B:
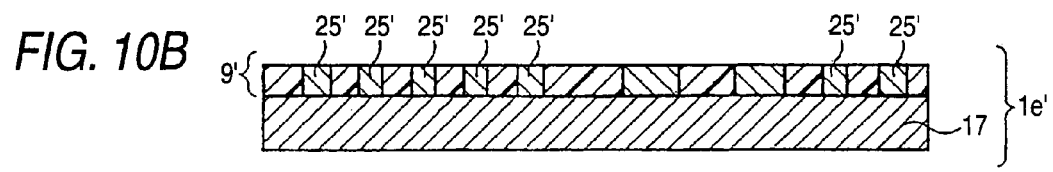

In this modification, the portions 5c1' corresponding to recording dots in the mold pattern are formed as protrusion portions. With reference to FIGS. 10A and 10B, this modification will be described along the method for manufacturing the composite type medium imprint stamper 1c' according to the modification of the third embodiment, by way of example.

FIG. 10A is a schematic sectional view for explaining a process for forming a resist film on a magnetic recording medium substrate 17 by use of a spin coat method or the like, and transferring a mold pattern of a composite type medium imprint stamper 1c' to the resist film. FIG. 10B is a schematic sectional view for explaining a process for charging a magnetic recording material into recess portions of a resist film 9' formed in FIG. 10A and drawing a molded pattern, so as to form recording dots 25.

First, as shown in FIG. 10A, differently from FIG. 9A, a resist film is formed on the magnetic recording medium substrate 17 without putting a magnetic layer therebetween. After that, the mold pattern of the composite type medium imprint stamper 1c' is transferred to the resist film. Thus, the resist film 9' having a molded pattern is formed. In this event, portions corresponding to the recording dots 25 are formed as recess portions adjacent to the resist film 9'.

Next, as shown in FIG. 10B, the dot-like recess portions are filled with recording dots 25'. Examples of methods for filling the recess portions with the recording dots 25' include an electroless plating method, an electrolytic plating method, a sputtering method, etc. When plating is used, it is preferable that the substrate is exposed to accelerate the plating growth. To this end, it is desired that a resist residue on the surface of the substrate 17 adjacent to the resist film 9' is removed by etching such as an RIE method before filling with the recording dots 25'. Alternatively, a process for flattening the surface by CMP (Chemical Mechanical Polishing) or the like to thereby remove the residue of the magnetic recording material on the resist film 9' maybe added after the magnetic recording material is charged to create the recording dots 25'.

According to this embodiment, the first transfer regions 3c corresponding to servo regions and the second transfer regions 5c corresponding to data regions can be transferred concurrently by batch transfer using the obtained composite type medium imprint stamper 1c. In contrast, according to the method for manufacturing a magnetic recording medium in the fifth embodiment, the servo region medium imprint stamper 1a and the data region medium imprint stamper 1b are transferred in turn. According to this embodiment, therefore the time required for one transfer process (for example, about 3 seconds) can be shortened in comparison with that in the fifth embodiment.

Further, in the manufacturing method according to the fifth embodiment, it is necessary to acquire misregistration information for every magnetic recording medium. Therefore, a process for acquiring the misregistration information is required for all the magnetic recording media. For this process, it takes about 10 seconds per medium. In contrast, according to this embodiment, once misregistration information is grasped about the servo regions 3e and the data regions 5e of a magnetic recording medium, the misregistration information can be used for all the magnetic recording medium coming from one and the same master 1d and therefore having the same misregistration information. Accordingly, the process for acquiring the misregistration information becomes unnecessary so that the time of about 10 seconds per medium can be shortened. Thus, the time to manufacture magnetic recording media can be shortened on a large scale.

From the above description, this embodiment is suitable for mass production of magnetic recording media having high recording density and high positioning accuracy. Incidentally, the same effects can be applied to the modification.

Fifth Embodiment

Description will be made below on a method for manufacturing a magnetic recording medium according to the fifth configuration of the invention. This embodiment will be described along the method for manufacturing a magnetic recording medium using the imprint stampers according to the first embodiments, by way of example.

The fifth embodiment relates to a method for manufacturing a magnetic recording medium using imprint stampers in the same manner as the fourth embodiment. While the composite type medium imprint stamper 1c according to the second embodiment is used in the fourth embodiment, the servo region medium imprint stamper 1a and the data region medium imprint stamper 1b according to the first embodiment are used in the fifth embodiment.

That is, in this embodiment, the process for transferring the composite type medium imprint stamper 1c shown in FIG. 9A is replaced by the process for transferring the data region medium imprint stamper 1b and the servo region medium imprint stamper 1a onto the magnetic recording medium substrate 17 in turn. In this event, the transfer order is reversible, and the aforementioned positioning is required for the transfer process. In addition, the master 1d and the composite type medium imprint stamper 1c are not produced in this method for manufacturing a magnetic recording medium.

A modification of the fifth embodiment will be described below.

In this modification, portions 5c1' corresponding to recording dots in the mold pattern are formed as protrusion portions. This modification will be described along the manufacturing method using the servo region medium imprint stamper 1a' and the data region medium imprint stamper 1b' according to the modification of the third embodiment, by way of example.

Likewise about the modification, the process for transferring the composite type medium imprint stamper 1c' shown in FIG. 10A is replaced by the process for transferring the servo region medium imprint stamper 1a' and the data region medium imprint stamper 1b' onto the magnetic recording medium substrate 17 in turn.

The magnetic recording medium manufactured in the manufacturing method according to this embodiment is characterized in that an exact servo region pattern and an exact data region pattern can be selected for magnetic recording media individually when there are a plurality of different kinds of servo region patterns and a plurality of different kinds of data region patterns among the magnetic recording media. Due to this characteristic, there is an effect that a servo region pattern optimized for each magnetic recording/reproducing apparatus can be selected in spite of an equal data region pattern.

In addition, when there is a difference in life between the servo region medium imprint stamper 1a and the data region medium imprint stamper 1b, each imprint stamper can be exchanged separately. Thus, there is an effect that the period of use of the imprint stamper unnecessary to exchange can be extended.

From the above description, it can be noted that the method for manufacturing a magnetic recording medium according to this embodiment is suitable for small-lot multiproduct. Incidentally, the same effects can be applied to the modification.

Sixth Embodiment

Figure 11:
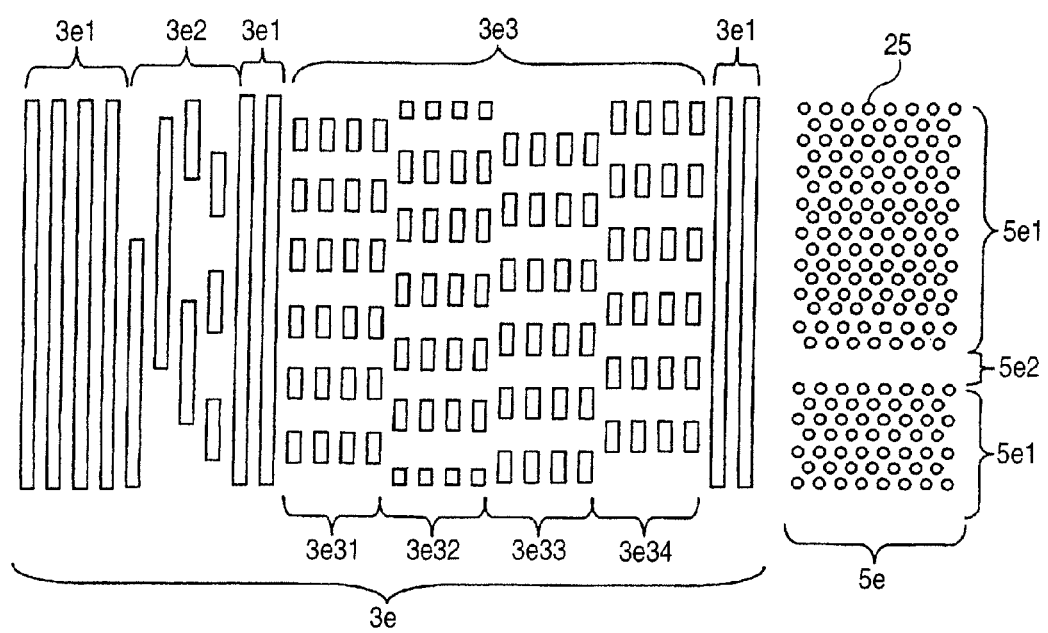
FIG. 11 is an enlarged schematic surface view for explaining a magnetic recording medium according to a sixth embodiment related to a sixth configuration of the invention.

Description will be made on a magnetic recording medium according to the sixth configuration of the invention. With reference to FIG. 11, this embodiment will be described along the magnetic recording medium manufactured using the imprint stamper according to the second embodiment.

The magnetic recording medium according to this embodiment is manufactured by use of the composite type medium imprint stamper 1c according to the second embodiment. Therefore, the magnetic recording medium has a disc-like shape and is of a sector servo system. Servo regions 3e of the magnetic recording medium correspond to the first transfer regions 3c of the composite type medium imprint stamper 1c, and data regions 5e correspond to the second transfer regions 5c. Accordingly, in the magnetic recording medium according to this embodiment, in the same manner as in the schematic surface view of FIG. 1C, recording tracks of the data regions are arranged coaxially in the surface of the magnetic recording medium, and six servo regions having position information of recording tracks are formed from the axis side toward the outer edge so as to run across a plurality of corresponding tracks.

FIG. 11 is an enlarged schematic view of the surface of a part of the magnetic recording medium according to this embodiment. Although there is in fact a distance of about 50 μm between the servo region 3e and the data region 5e, a reduced distance is drawn between the two regions for the sake of convenience.

As shown in FIG. 11, the servo region 3e is constituted by a plurality of quadrilateral recording materials because it is created by an artificial drawing method. In the same manner as in the background art, for example, a positioning signal of the servo region 3e is constituted by a preamble signal 3e1, an address signal 3e2 and a burst signal 3e3. The position of a recording/reproducing head on the servo region can be grasped correctly from a signal obtained when the recording/reproducing head is passing the servo region in the left/right direction of the paper of FIG. 11.

The preamble signal 3e1 is a striped pattern crossing the track direction at right angles.

The address signal 3e2 has track information and sector information. It is preferable that a Gray code is used for the address signal 3e2 so that address information can be obtained even when the recording/reproducing head is running from one track to another track. In FIG. 11, for the sake of convenience, the address signal 3e2 is formed out of a pattern of four columns. However, for example, assume that the number of tracks is about 400,000. Then, the address signal 3e2 will have a pattern of about 20 columns.

The burst signal 3e3 is used for acquiring position information in a track. For example, the burst signal 3e3 specifies the central position of the track. The burst signal 3e3 is, for example, constituted by four kinds of bursts, that is, an A burst 3e31, a B burst 3e32, a C burst 3e33 and a D burst 3e34. Each burst is formed out of four columns of quadrilateral recording materials crossing the track direction at right angles. Each column is constituted by an intermittent pattern of quadrilateral recording materials arranged at an equal interval. The interval is equal to the track width, and the length of one side of each quadrilateral recording material perpendicular to the track direction is also equal to the track width.

The A burst 3e31, the B burst 3e32, the C burst 3e33 and the D burst 3e34 have an equal shape of quadrilateral recording materials and an equal intermittent pattern crossing the track width at right angles, but there is a difference only in phase among their intermittent patterns. The phase of one burst differs from that of another by a quarter of the period. Thus, there occurs a lag of a half of the period in the B burst 3e32 with respect to the A burst 3e31. The C burst 3e33 is later than the A burst 3e31 by a quarter of the period, and the D burst 3e34 is later than the A burst 3e31 by three quarters of the period (on the assumption that the downward direction of the paper of FIG. 11 is a positive direction).

A method for specifying the central position of a track using the burst 3e3 will be described. In FIG. 11, as will be described later, two rows of dots are regarded as one track. For example, the second and third rows from the top form one track. The track in the second and third dot rows is positioned with reference to the positioning of the center of the third dot row, using the upper sides of four quadrilateral recording materials located in the uppermost stage in the C burst 3e33 and the lower sides of four quadrilateral recording materials located in the uppermost stage in the D burst 3e34.

Each quadrilateral recording material, for example, measures about 43 nm by 25 nm in the burst signal 3e3. For the sake of convenience, in FIG. 11, the four corners of each quadrilateral shape make right angles in each pattern. In fact, each corner has a curvature radius of about 12 nm.

Incidentally, in FIG. 11, each burst is formed out of four columns of quadrilateral recording materials. In fact, however, each burst is formed out of about 20 columns of quadrilateral recording materials. The number of columns depends on the processing accuracy of the quadrilateral recording materials. As the processing accuracy is higher, higher positioning accuracy can be attained with a smaller number of columns of quadrilateral recording materials. In this embodiment, the corner curvature radius is about 12 nm. The processing accuracy is so low that the positioning accuracy obtained by one quadrilateral recording material is low. However, when an average value is obtained from a large number of quadrilateral recording materials, the positioning accuracy of about 2 nm can be attained.

The data region 5e in FIG. 11 is a region which is a part of the vicinity of the aforementioned servo region 3e. Generally, a plurality of servo regions 3e and a plurality of data regions 5e as shown in FIG. 11 are formed so that each data region 5e is formed between adjacent ones of the servo regions 3e. Each data region 5e is created by a pattern forming method using a self-assembled material. Each data region 5e has a recording zone 5e1 constituted by recording dots 25 arrayed like a hexagonal lattice, and a guide zone 5e2 where the recording materials are absent. These zones are parallel to the track direction.

The width of the recording zone 5e1 depends on the crystallinity of the self-assembled material. The width is wide enough to arrange the self-assembled material in parallel in the aforementioned process of self-assembling. When the crystallinity of the self-assembled material is high, there is no fear that the self-assembled material is arranged obliquely with respect to the guide zone even when the recording zone 5e1 is wide. In this embodiment, the width of the recording zone 5e1 is set at about 1 μm.

The guide zone 5e2 helps the self-assembled material be arranged correctly to form tracks in the aforementioned process of self-assembling. In this embodiment, the guide zone 5e2 has a width of about 50 nm.

In the data region 5e, each recording dot 25 has a diameter of about 10 nm, and the distance between centers of adjacent ones of the recording dots 25 is about 25 nm. Two rows of recording dots 25 are formed as one track, and the track width is about 43 nm. The recording density is about 800 Gbpsi.

In this embodiment, each servo region has no unnecessary dot as has been produced in the background art. Accordingly, in this embodiment, it is possible to obtain a magnetic recording medium having high-recording-density data regions created by a pattern forming method using a self-assembled material, and high-precision servo regions created by an artificial drawing method.

Seventh Embodiment

A seventh embodiment related to a magnetic recording medium according to the seventh configuration of the invention will be described below. Description will be made with reference to FIGS. 12A, 13 and 14.

Figure 12A:
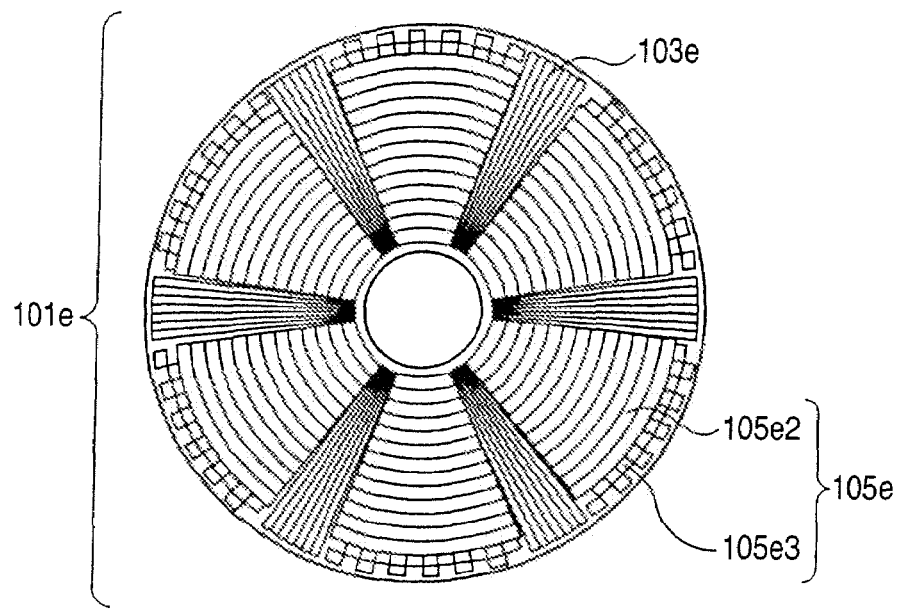
FIGS. 12A and 12B are schematic surface views for explaining magnetic recording media according to a seventh embodiment related to a seventh configuration of the invention.
Figure 13:
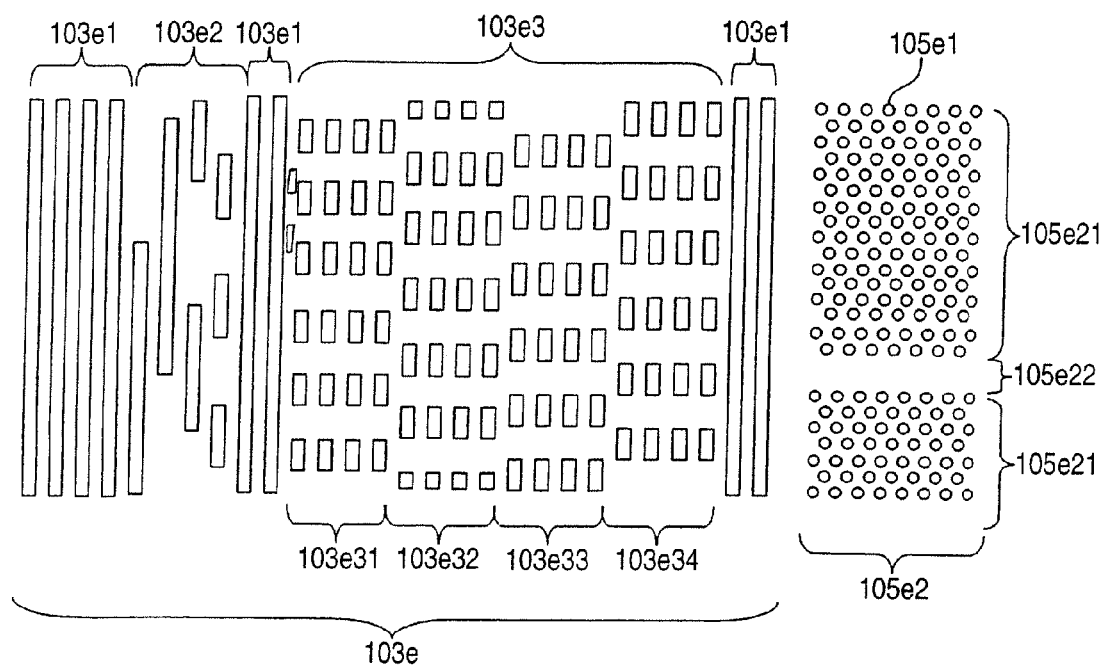
FIG. 13 is a schematic surface view for explaining a servo region of the magnetic recording medium according to the seventh embodiment related to the seventh configuration of the invention.
Figure 14:
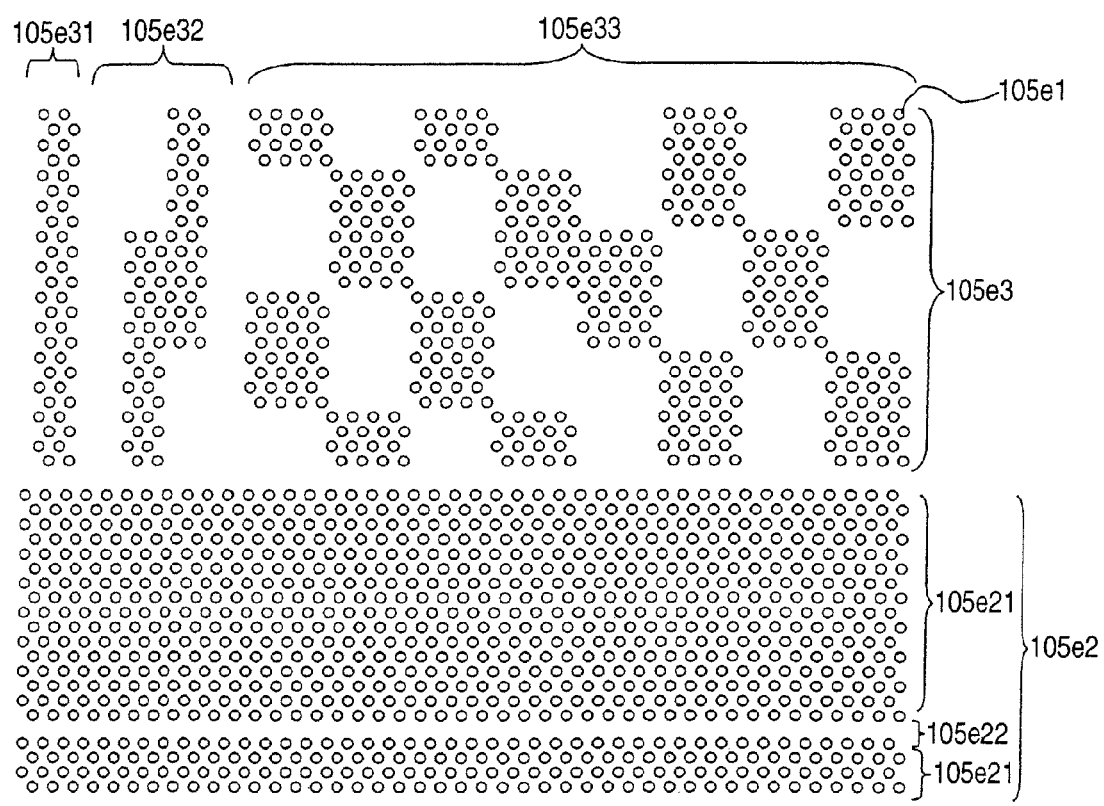
FIG. 14 is a schematic surface view for explaining a data region of the magnetic recording medium according to the seventh embodiment related to the seventh configuration of the invention.

FIG. 12A is a schematic surface view showing a magnetic recording medium 101e. FIG. 13 is a partially enlarged schematic surface view of a servo region 103e of the magnetic recording medium 101e depicted in FIG. 12A and a data recording region 105e2 near the servo region 103e. FIG. 14 is a partially enlarged schematic surface view of a data region 105e of the magnetic recording medium 101e depicted in FIG. 12A.

As shown in FIG. 12A, the magnetic recording medium 101e has a disc-like shape whose diameter is about 6.5 cm, and a sector servo system is used in the magnetic recording medium 101e. Accordingly, in the magnetic recording medium 101e, tracks in each data region 105e are arranged coaxially in the surface of the magnetic recording medium 101e. Six servo regions 103e including position information (preamble signal, address signal, burst signal, etc.) of respective tracks are formed radially from the inner edge of the magnetic recording medium 101e toward the outer edge thereof so as to run across a plurality of corresponding tracks. The data regions 105e of the magnetic recording medium are regions other than the servo regions 103e. That is, the data regions 105e are six radial regions extending from the inner edge of the magnetic recording medium 101e toward the outer edge thereof. Each data region 105e includes a data recording region 105e2 and a data positioning signal region 105e3. The data recording region 105e2 is a radial region located in an inner edge portion of the data region 105e and extending from the inner edge of the magnetic recording medium 101e toward the outer edge thereof. The data positioning signal region 105e3 is a fan-shaped region located in an outer edge portion of the data region 105e.

The required width of the data positioning signal region 105e3 depends on the size of misregistration between the servo region 103e and the data region 105e. The data positioning signal region 105e3 is a region about 0.02 cm distant from the outer edge of the disk. For the sake of convenience, the width of the data positioning signal region 105e3 is shown to be thicker in FIG. 12A. Although the data positioning signal region 105e3 is located in the outer edge portion in FIG. 12A, the invention is not limited thereto. For example, the data positioning signal region 105e3 may be located in an inner edge portion of the data region 105e.

In the magnetic recording medium 101e, as described above, it is assumed that the servo regions 103e are formed in a method using an artificial drawing method, and the data regions 105e are formed in a method using a self-assembled material, while a physical method is used for positioning in both the methods. Accordingly, though no misregistration is observed in FIG. 12A which is a macroscopically schematic view of the several-inch disk, it is highly likely that misregistration not larger than about 30 μm occurs between the servo regions 103e and the data regions 105e microscopically.

Next, description will be made on each region of the magnetic recording medium 101e.

FIG. 13 is an enlarged schematic surface view of a part of the magnetic recording medium according to this embodiment. Although the real distance between the servo region 103e and the data region 105e is several tens of micrometers, a reduced distance is drawn between the two regions for the sake of convenience.

As shown in FIG. 13, the servo region 103e is constituted by a plurality of quadrilateral recording materials because it is created by an artificial drawing method. In the same manner as in the background art, a positioning signal of the servo region 103e is, for example, constituted by a preamble signal 103e1, an address signal 103e2 and a burst signal 103e3. The position of a recording/reproducing head on the servo region can be grasped correctly from a signal obtained when the recording/reproducing head passes the servo region in the left/right direction of the paper of FIG. 13.

The preamble signal 103e1 is a striped pattern crossing the track direction at right angles.

The address signal 103e2 has track information and sector information. It is preferable that a Gray code is used for the address signal 103e2 so that address information can be obtained even when the recording/reproducing head is running from one track to another track. In FIG. 13, for the sake of convenience, the address signal 103e2 is formed out of a pattern of four columns. However, for example, assume that the number of tracks is about 400,000. Then, the address signal 103e2 will have a pattern of about 20 columns.

The burst signal 103e3 is used for acquiring position information in a track. For example, the burst signal 103e3 has information for specifying the central position of the track. The burst signal 103e3 is, for example, constituted by four kinds of bursts, that is, an A burst 103e31, a B burst 103e32, a C burst 103e33 and a D burst 103e34. Each burst is formed out of four columns of quadrilateral recording materials crossing the track direction at right angles. Each column is constituted by an intermittent pattern of quadrilateral recording materials arranged at an equal interval. The length of one side of each quadrilateral recording material perpendicular to the track direction, and the interval of the intermittent pattern are equal to the track width.

The A burst 103e31, the B burst 103e32, the C burst 103e33 and the D burst 103e34 have an equal shape of quadrilateral recording materials and an equal intermittent pattern crossing the track width at right angles, but there is a difference only in phase among their intermittent patterns. The phase of one burst differs from that of another by a quarter of the period. Thus, there occurs a lag of a half of the period in the B burst 103e32 with respect to the A burst 103e31. The C burst 103e33 is later than the A burst 103e31 by a quarter of the period, and the D burst 103e34 is later than the A burst 103e31 by three quarters of the period, on the assumption that the downward direction of the paper of FIG. 13 is a positive direction.

A method for specifying the central position of a track using the burst 103e3 will be described. In FIG. 13, as will be described later, two rows of dots are regarded as one track. For example, the second and third rows from the top form one track. The track in the second and third dot rows is positioned with reference to the positioning of the center of the third dot row, using the upper sides of four quadrilateral recording materials located in the uppermost stage in the C burst 103e33 and the lower sides of four recording materials located in the uppermost stage in the D burst 103e34.

Each quadrilateral recording material, for example, measures about 43 nm by 25 nm in the burst signal 103e3. For the sake of convenience, in FIG. 13, the four corners of each quadrilateral shape make right angles in each pattern. In fact, each corner has a curvature radius of about 12 nm.

Incidentally, in FIG. 13, each burst is formed out of four columns of quadrilateral recording materials. In fact, however, each burst is formed out of about 20 columns of quadrilateral recording materials. When an average value is obtained from the about 20 quadrilateral recording materials, the positioning accuracy of about 2 nm can be attained.

The data recording region 105e2 in FIG. 13 is a part of a region located in the vicinity of the aforementioned servo region 103e. The data recording region 105e2 will be described in detail with reference to FIG. 14.

As shown in FIG. 14, the data region 105e is formed in a method using a self-assembled material. Thus, the data region 105e is chiefly constituted by recording dots 105e1 arrayed like a hexagonal lattice. Each recording dot 105e1 has a diameter of about 10 nm, and the distance between centers of adjacent ones of the recording dots 105e1 is about 25 nm. The recording density is about 795 Gbpsi.

The data recording region 105e2 has a recording zone 105e21 constituted by recording dots 105e1 arrayed like a hexagonal lattice, and a guide zone 105e22 having no recording materials. These zones are parallel to the tracks.

The width of the recording zone 105e21 depends on the crystallinity of the self-assembled material. The width is made wide enough to form the self-assembled material out of a single hexagonal lattice in the process for forming tracks using a regular array of the self-assembled material when the magnetic recording medium is manufactured. For the sake of convenience, the width of the recording zone 105e21 is shown to be narrow in FIG. 14, but it is in fact, for example, about 1 μm.

The guide zone 105e22 helps the self-assembled material be arranged in parallel with the guide zone 105e22 to form tracks in the aforementioned track forming process. In FIG. 14, it is assumed that the guide zone 105e22 has a width of about 50 nm.

The data positioning signal region 105e3 is constituted by a preamble signal region 105e31, an address signal region 105e32, a burst signal region 105e33, etc. The data positioning signal region 105e3 requires at least the address signal region 105e32 and the burst signal region 105e33. Each signal region has a pattern constituted by a quadrilateral section formed out of recording dots 105e1 like a hexagonal lattice and a quadrilateral section including no recording material.

The pattern constituted by the sections has a shape similar to that of the servo region 103e in FIG. 13, but there is a difference only in dimensions. The pattern is drawn with reference to the track width in the servo region 103e, and with reference to the data positioning track width in the data positioning signal region 105e3. FIG. 14 shows three rows of data positioning tracks, each of which is constituted by four rows of tracks. Incidentally, two dot rows are regarded as one track in FIG. 14 in the same manner as in FIG. 13.

These signal regions have the same characteristic as the positioning signal in the servo region.

The pattern shape of the preamble signal region 105e31 is similar to the pattern shape of a preamble signal in a servo region in the background art, which is a striped pattern crossing the track direction at right angles.

The address signal region 105e32 has data positioning track information and sector information. It is preferable that a Gray code is used so that address information can be obtained even when the recording/reproducing head is running from one data positioning track to another. In FIG. 14, for the sake of convenience, the address signal region 105e32 is formed out of a pattern of two columns. However, for example, assume that the number of data positioning tracks in the data positioning signal region 105e32 is about 700. Then, the address signal region 103e2 will have a pattern of about 12 columns.

The burst signal region 105e33 is used for acquiring position information in a data positioning track. For example, the burst signal region 105e33 has information for specifying the central position of the data positioning track. In FIG. 14, the burst signal region 105e33 has four different pairs of columns (that is, eight columns in total) crossing the tracks at right angles. Each column is constituted by an intermittent pattern of quadrilateral sections arranged at an equal interval, each quadrilateral section being made from recording dots 105e1 arrayed like a hexagonal lattice. The length of one side of each quadrilateral section perpendicular to the track direction and the interval of the intermittent portion of the intermittent pattern are equal to the width of the data positioning track. The phase of one intermittent pattern differs from that of another by a quarter of the period, and there occurs a gap between the intermittent patterns by an integral multiple or a half-integral multiple of the data positioning track width.

A signal having intensity proportional to the area the head passes over is obtained from each of these intermittent patterns when the head passes the data positioning signal region 105e3. When the signal intensity obtained from one intermittent pattern is compared with that from another, the position of the head in the data positioning track can be grasped.

Each section of the data positioning signal region 105e3 formed out of recording dots 105e1 arrayed like a hexagonal lattice, for example, measures about 156.4 nm by 97.5 nm in a burst signal. The area of the section is several times as large as that of each quadrilateral recording material of the servo region 103e. Accordingly, since each pattern is constituted by an enough large number of recording dots 105e1, the misregistration and the dimensional divergence in each recording dot 105e1 which are to be solved by the invention can be averaged so that the positioning accuracy of about 2 nm can be attained.

Incidentally, the dimensions of each section and hence the dimensions of the data positioning signal region 105e3 depend on the required positioning accuracy, the dimensions of each recording dot 105e1, and the degree of misregistration and the degree of dimensional divergence among the recording dots 105e1.

A modification of the seventh embodiment will be described below with reference to FIG. 12B.

The shape of the magnetic recording medium according to the seventh configuration of the invention is not limited to a disc-like shape as shown in FIG. 12A. A modification in which the surface shape of the magnetic recording medium is quadrilateral will be described with reference to FIG. 12B.

Figure 12B:
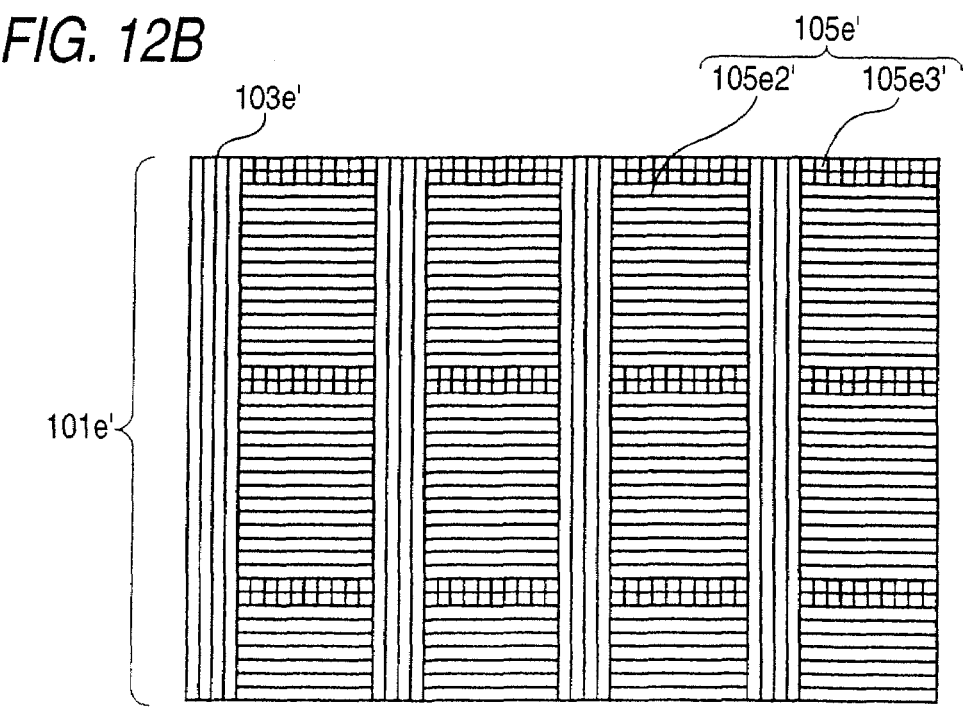

FIG. 12B is a schematic surface view showing a magnetic recording medium 101e' according to this modification. The magnetic recording medium 101e' is of a sector servo system and has a quadrilateral surface shape.

Respective tracks extend in the longitudinal direction of the magnetic recording medium so as to be arranged in parallel with each other, and each servo region 103e' is formed to extend over a plurality of tracks. Thus, as shown in FIG. 12B, the servo regions 103e' are formed to cross all the tracks at right angles. The servo regions 103e' are formed in four places at a predetermined interval in the running direction of the magnetic head, in the longitudinal direction of the tracks. Incidentally, the accuracy of a positioning signal is higher in a position closer to the positioning signal. Accordingly, the number, dimensions and locations of the servo regions 103e' vary in accordance with required positioning accuracy.

Data regions 105e' are regions other than the servo regions 103e'. Further, each data region 105e includes data recording regions 105e2' and data positioning signal regions 105e3'. In FIG. 12B, each data positioning signal region 105e3' is a quadrilateral region, and its longitudinal direction corresponds to the track direction. Three data positioning signal regions 105e3' in total are formed at a predetermined interval in a direction perpendicular to the tracks. Incidentally, the accuracy of a positioning signal is higher in a position closer to the positioning signal. Accordingly, the number, dimensions and locations of the positioning signal regions 105e3' vary in accordance with required positioning accuracy. The data recording regions 105e2' are formed in regions other than the data positioning signal regions 105e3' in the data region 105e'.

As described above, the magnetic recording medium according to the seventh embodiment is characterized in that the servo regions 103e are formed in a method using an artificial drawing method so that they have high accuracy, and the data regions 105e are formed in a method using a self-assembled material so that they have high recording density and can be formed easily and simply, while a positioning signal is present in each of the servo regions 103e and the data regions 105e. Due to this characteristic, as will be described later, the relative misregistration between the servo regions 103e and the data regions 105e can be corrected in a magnetic recording/reproducing method using the magnetic recording medium. Further, the dimensions of the data positioning signal regions 105e3 can be changed desirably in accordance with required positioning accuracy. Accordingly, the accuracy of positioning signals can be made easily to follow the height of the recording density of the magnetic recording medium. Incidentally, the same effects can be applied to the modification.

Eighth Embodiment

Description will be made below on a magnetic information recording/reproducing method according to the eighth configuration of the invention. This embodiment is a magnetic information recording/reproducing method using a magnetic recording medium according to the seventh embodiment. The eighth embodiment will be described with reference to FIGS. 15A and 15B.

Figure 15A:
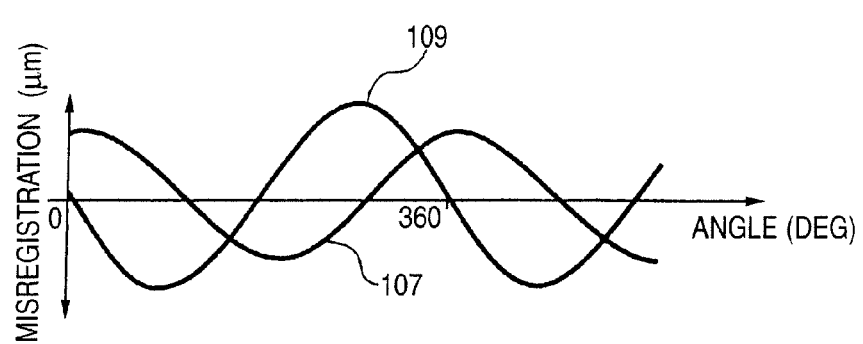
FIGS. 15A and 15B are views for explaining a magnetic recording/reproducing method according to an eighth embodiment related to an eighth configuration of the invention.
Figure 15B:
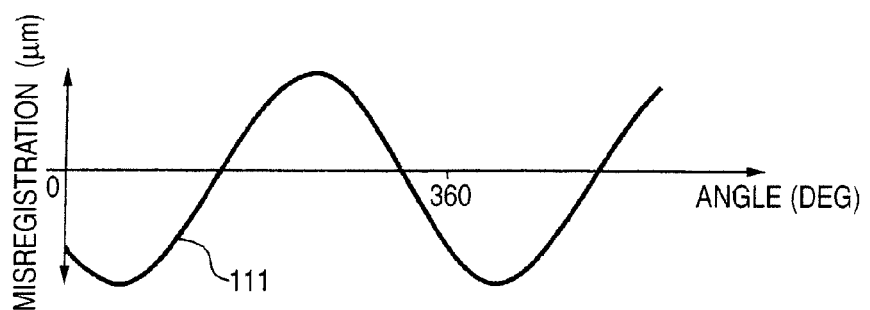

FIG. 15A is a schematic view for explaining misregistration information of a servo region and misregistration information of a data region with respect to the rotation center of a magnetic recording medium. FIG. 15B is a schematic view for explaining relative misregistration information of the data region with respect to the servo region.

First, a method for reading misregistration between the rotation center and the center of circular magnetic information based on a positioning signal is explained. Generally, there is a limit in the positioning accuracy in a process for manufacturing a magnetic recording medium. Therefore, when the magnetic recording medium is a disk, there occurs misregistration between the rotation center of the disk and the center of circular magnetic information in the disk surface. This misregistration is within about 30 μm in the case of physical positioning. The misregistration can be corrected using a positioning signal in a servo region in a magnetic recording/reproducing process.

Assume that the X-axis designates an angle with reference to a desired radial direction in the rotation center, and the Y-axis designates misregistration of magnetic information (the outside of the circle is regarded as positive). Misregistration information is obtained over the course of 360 degrees with which the magnetic recording medium rotates. Thus, omnidirectional misregistration information can be read, and the misregistration information draws a substantially sine curve. During magnetic recording/reproducing, the position of the recording/reproducing head on the magnetic recording medium is controlled to run on a predetermined track based on the misregistration information.

The magnetic information recording/reproducing method according to this embodiment will be described below with reference to FIGS. 15A and 15B.

The method in which the recording/reproducing head reads information from a positioning signal in a data region is similar to a method generally carried out in a positioning signal in a servo region. As shown in FIG. 14, the data positioning signal region 105e3 has a pattern including a quadrilateral section made of recording dots 105e1 and a quadrilateral section having no recording material. When the recording/reproducing head passes the data positioning signal region 105e3 in the invention, a signal recorded in the recording dots 105e1 is obtained in the section made of the recording dots 105e1, but no signal is obtained in the portion where the recording dots 105e1 are absent. The recording/reproducing head acquires position information of the recording/reproducing head with respect to the data region in accordance with the existence of the signal.

As shown in FIG. 12A, the servo regions 103e and the data positioning signal regions 105e3 are arrayed alternately in the outer edge portion of the magnetic recording medium 101e. Accordingly, when the recording/reproducing head passes a track in the outer edge portion of the magnetic recording medium 101e, positioning signals in the servo regions 103e and the data regions 105e can be obtained. As shown in FIG. 15A, servo region misregistration information 107 and data region misregistration information 109 can be obtained with respect to the rotation center of the magnetic recording medium based on the positioning signals from the servo regions 103e and the data regions 105e.

The servo region misregistration information 107 and the data region misregistration information 109 draw substantially sine curves as shown in FIG. 15A. The amplitude of the servo region misregistration information 107 indicates the distance between the rotation center of the magnetic recording medium and the center of the servo region. The X-axis angle in the maximum value of the amplitude indicates that the center of the servo region exists in the direction of the X-axis angle when viewed from the rotation center of the magnetic recording medium. The same things can be applied to the data region misregistration information 109. The amplitude of the misregistration information in this case is within about 30 μm when positioning in manufacturing the magnetic recording medium is carried out in a physical method.

Incidentally, the servo regions are not present omnidirectionally. Therefore, the servo region misregistration information 107 is obtained in only a part of angles. However, misregistration information in any direction can be estimated from the partial misregistration information obtained thus. FIG. 15A shows information about all the angles calculated from an obtained part of angles. The same thing can be applied to the data region misregistration information 109.

As shown in FIG. 15B, the servo region misregistration information 107 is subtracted from the data region misregistration information 109 so as to obtain relative misregistration information 111 of the data region with respect to the servo region. At the time of recording/reproducing, the position of the recording/reproducing head on the magnetic recording medium is controlled based on the misregistration information 111 so that the magnetic recording/reproducing head runs over a predetermined track.

In each data region, as will be described later, data recording regions and data positioning signal regions are transferred together by a data region imprint stamper. Thus, there occurs no misregistration between the data recording regions and the data positioning signal regions in any data region of the magnetic recording medium.

A modification of the eighth embodiment will be described below.

This modification is a method in which apparatus further including a memory unit capable of storing relative position information of a data region with respect to a servo region is used in the magnetic information recording/reproducing method according to the eighth embodiment. In the magnetic recording medium according to the seventh embodiment, relative position information of a data region with respect to a servo region is determined at the time of manufacturing the magnetic recording medium, and the relative position information has no change after that. Accordingly, once misregistration information is acquired, relative position information of a data region with respect to a servo region may be stored in a memory unit of magnetic information recording/reproducing apparatus in order to be read and used whenever recording/reproducing is performed. In this case, there is an advantage that it is not necessary to detect data region and servo region positioning signals and calculate relative misregistration information whenever recording/reproducing is carried out.

In such a manner, in the magnetic recording medium, positioning signals are read from a servo region and a data region respectively so as to obtain relative misregistration information of the data region with respect to the servo region. Based on the relative misregistration information, the position of the recording/reproducing head on the magnetic recording medium is controlled to run on a predetermined track. Thus, misregistration between the servo region and the data region formed in different methods can be corrected.

Ninth Embodiment

A magnetic recording medium manufacturing imprint stamper according to the ninth configuration of the invention will be described below with reference to FIGS. 16A, 16B, 17A and 17B.

Figure 16A:
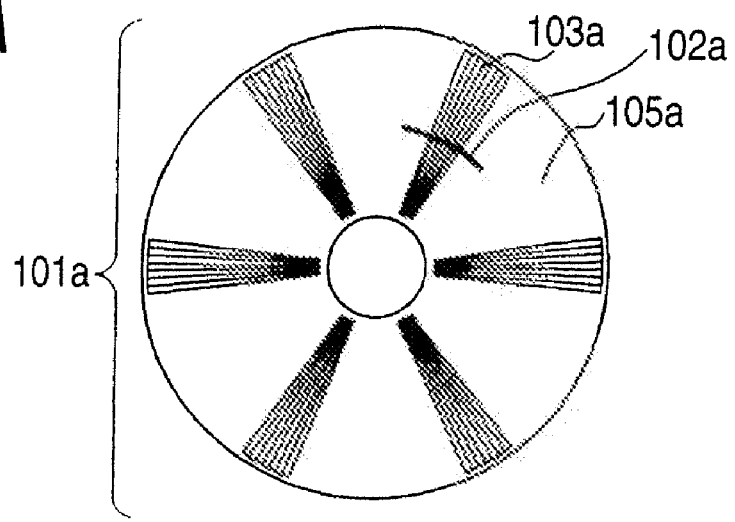
FIGS. 16A to 16C are schematic surface views for explaining imprint stampers according to ninth and tenth embodiments related to ninth and tenth configurations of the invention.
Figure 16B:
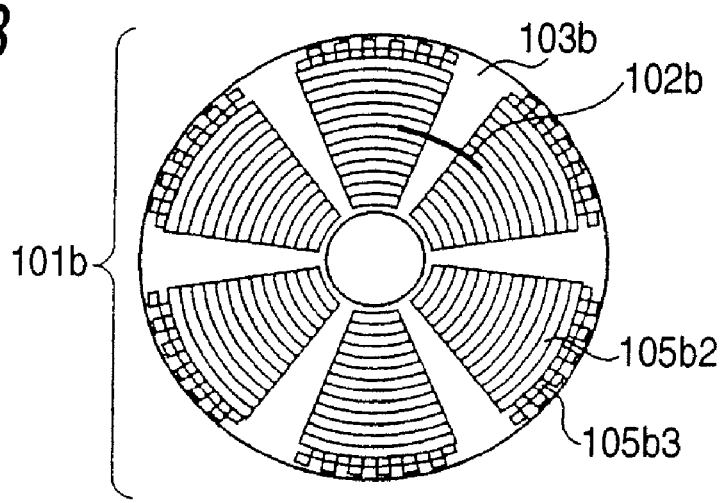
Figure 17A:
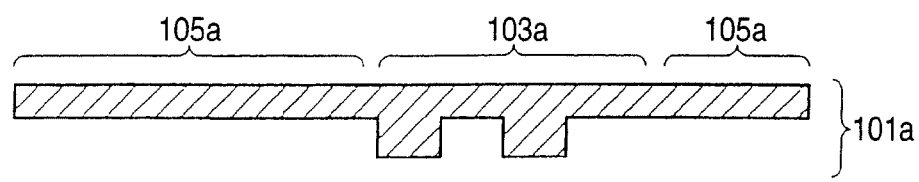
FIGS. 17A to 17C are schematic sectional views for explaining the imprint stampers according to the ninth and tenth embodiments related to the ninth and tenth configurations of the invention.
Figure 17B:
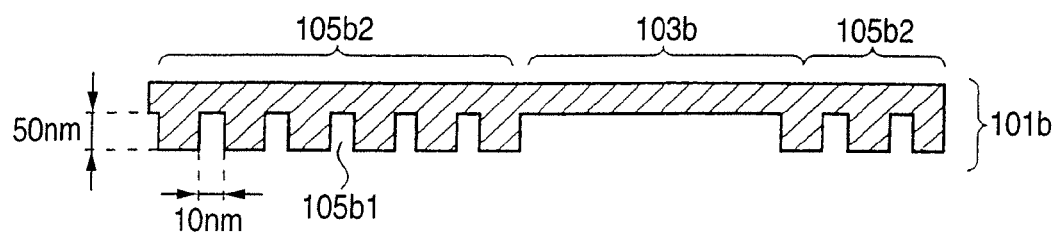

FIG. 16A is a schematic surface view showing a transfer surface of a servo region imprint stamper 101a. FIG. 16B is a schematic surface view showing a transfer surface of a data region imprint stamper 101b to be paired with the servo region imprint stamper 101a depicted in FIG. 16A. FIG. 17A is a schematic sectional view showing a portion of the servo region imprint stamper 101a designated by the solid line 102a. FIG. 17B is a schematic sectional view showing a portion of the data region imprint stamper 101b designated by the solid line 102b, the data region imprint stamper 101b being paired with the servo region imprint stamper 101a depicted in FIG. 17A.

The servo region imprint stamper 101a in FIG. 16A and the data region imprint stamper 101b in FIG. 16B serve to manufacture the magnetic recording medium 101e depicted in FIG. 12A.

Accordingly, FIG. 16A corresponds to FIG. 12A. That is, a first transfer region 103a of the servo region imprint stamper 101a corresponding to a servo region 103e of the magnetic recording medium 101e is a radial region running from the inner edge toward the outer edge. Six regions like this in total are formed on the magnetic recording medium. First non-transfer regions 105a of the servo region imprint stamper 101a located in conformity with the data regions 105e of the magnetic recording medium 101e are regions other than the first transfer regions 103a. The first non-transfer regions 105a are radial regions running from the inner edge toward the outer edge.

Likewise, FIG. 16B corresponds to FIG. 12A. Second transfer regions 105b2 of the data region imprint stamper 101b correspond to the data recording regions 105e2 of the magnetic recording medium 101e, and third transfer regions 105b3 corresponds to the data positioning signal regions 105e3, while second non-transfer regions 103b are located in conformity with the servo regions 105e of the magnetic recording medium 101e. That is, as shown in FIG. 16B, the second and third transfer regions 105b2 and 105b3 are regions other than the second non-transfer regions 103b, that is, six radial regions in total running from the inner edge toward the outer edge. Further, the second transfer regions 105b2 are radial regions located in the inner edge portion, and the third transfer regions 105b3 are fan-shaped regions located in the outer edge portion of the data region imprint stamper 101b.

The servo region imprint stamper 101a includes the first transfer regions 103a corresponding to the servo regions of the magnetic recording medium and the first non-transfer regions 105a located in conformity with the data regions of the magnetic recording medium as shown in FIG. 16A. On the other hand, the data region imprint stamper 101b includes the second and third transfer regions 105b2 and 105b3 corresponding to the data regions of the magnetic recording medium and the second non-transfer regions 103b located in conformity with the servo regions of the magnetic recording medium as shown in FIG. 16B.

That is, the first transfer regions 103a of the servo region imprint stamper 101a are located in conformity with the second non-transfer regions 103b of the data region imprint stamper 101b, and the first transfer regions 103a are transferred to a partial surface of a magnetic recording medium substrate or the like in conformity therewith. The first transfer regions 103a serve to form the servo regions 103e of the magnetic recording medium 101e depicted in FIG. 12A.

In the same manner, the first non-transfer regions 105a of the servo region imprint stamper 101a are located in conformity with the second and third transfer regions 105b2 and 105b3 of the data region imprint stamper 101b, and the second and third transfer regions 105b2 and 105b3 are transferred to a partial surface of the magnetic recording medium substrate in conformity therewith. The second and third transfer regions 105*b*2 and 105*b*3 serve to form the data regions 105*e* of the magnetic recording medium 101*e* depicted in FIG. 12A.

Next, description will be made on each region of the servo region imprint stamper 101*a*.

The recess/protrusion structure of each first transfer region 103*a* can be formed in an artificial drawing method suitable to the servo region. The first transfer region 103*a* is constituted by a plurality of recess portions each having a quadrilateral bottom. As shown in FIG. 17A, each recess portion is about 50 nm deep. The quadrilateral shape of the bottom of the recess portion is, for example, assumed to have an area of about 43×25 nm$^2$ and a curvature radius of 12 nm at each corner in the bottom corresponding to a burst signal.

Although only one recess portion appears in the first transfer region 103*a* shown in FIG. 17A for the sake of convenience, there are a large number of recess portions in the real first transfer region 103*a* (the same thing can be applied to FIGS. 17B, 17C, 18A, 18B and 18C which are drawings corresponding to FIG. 17A).

Each first non-transfer region 105*a* of the servo region imprint stamper 101*a* has a flat surface having no recess/protrusion structure. Due to this characteristic, there is no fear that the first non-transfer region 105*a* hinders the corresponding second and third transfer regions 105*b*2 and 105*b*3 of the data region imprint stamper 101*b* from achieving good transfer to a substrate, which transfer will be described later.

Next, description will be made on each region of the data region imprint stamper 101*b*.

The recess/protrusion structures of the second and third transfer regions 105*b*2 and 105*b*3 can be formed in a method using a self-assembled material suitable to the data region. Each of the second and third transfer regions 105*b*2 and 105*b*3 is chiefly constituted by a plurality of dot-like recess portions 105*b*1 arrayed like a hexagonal lattice. The dot-like recess portions 105*b*1 correspond to recording dots. In this embodiment, as shown in FIG. 17B, each dot-like recess portion 105*b*1 is assumed to have a diameter of about 10 nm in top view, and a depth of about 50 nm. A distance between centers of the dot-like recess portions 105*b*1 adjacent to each other is about 25 nm. Incidentally, the dot-like recess portion 105*b*1 can have any shape if it is circular in top view. Therefore, though the dot-like recess portion 105*b*1 is columnar in FIG. 17B, it may have a semispherical shape or the like.

Each second transfer region 105*b*2 has a region corresponding to a recording zone constituted by a plurality of dot-like recess portions 105*b*1 arrayed like a hexagonal lattice, and a guide zone having no recess portion.

Each third transfer region 105*b*3 is constituted by regions corresponding to a preamble signal region, an address signal region, a burst signal region, etc. in the magnetic recording medium. Each region corresponding to each signal region has a pattern constituted by a quadrilateral section made of dot-like recess portions and a quadrilateral section having no recess portion. For example, each section has an area of about 156.4×97.5 nm$^2$ in a burst signal.

Each second non-transfer region 103*b* of the data region imprint stamper 101*b* has a flat surface having no recess/protrusion structure. Due to this characteristic, there is no fear that the second non-transfer region 103*b* hinders the corresponding first transfer region 103*a* of the servo region imprint stamper 101*a* from achieving good transfer to a substrate.

Incidentally, the surface of an actual magnetic recording medium imprint stamper having a diameter of about 6.5 cm may not have a perfectly flat surface but have a gentle curved surface having an error up to about 1 μm in height. At the time of transfer, therefore, the substrate comes in close contact with the curved surface so as to follow it. The height of the curved surface is several tens of times as large as the depth about 50 nm of each recess portion of the pattern in the first transfer region 103*a*, the second transfer region 105*b*2 and the third transfer region 105*b*3. However, the height of the curved surface has such a gentle change that the height does not exert a strong influence on the transfer of the recess/protrusion structure. In addition, it is highly likely that each "flat surface" of the first non-transfer region 105*a* and the second non-transfer region 103*b* is not a perfect flat surface but such a curved surface, and it does not exert a strong influence on the transfer of the recess/protrusion structure.

Next, description will be made on the materials of the servo region imprint stamper 101*a* and the data region imprint stamper 101*b*.

Examples of the materials of the servo region imprint stamper 101*a* and the data region imprint stamper 101*b* include metals, alloys, metal oxides, ceramic materials, inorganic materials such as glass, semiconductors, or mixtures of these materials. Particularly nickel (Ni), aluminum (Al), silicon (Si), silicon carbide (SiC), glass, quartz, diamond, etc. are preferred.

A modification of the ninth embodiment will be described below.

This modification relates to an imprint stamper according to the ninth embodiment, in which portions corresponding to recording dots in the imprint stamper are protrusion portions. The modification will be described below with reference to FIGS. 18A and 18B.

Figure 18A:
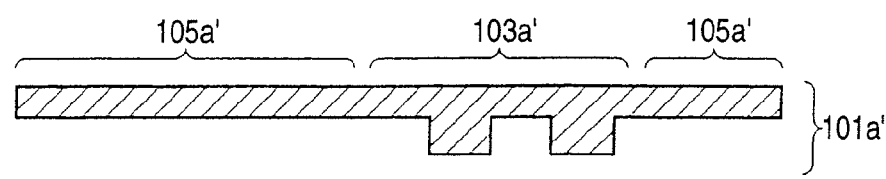
FIGS. 18A to 18C are schematic sectional views for explaining imprint stampers according to modifications of the ninth and tenth embodiments related to the ninth and tenth configurations of the invention.
Figure 18B:
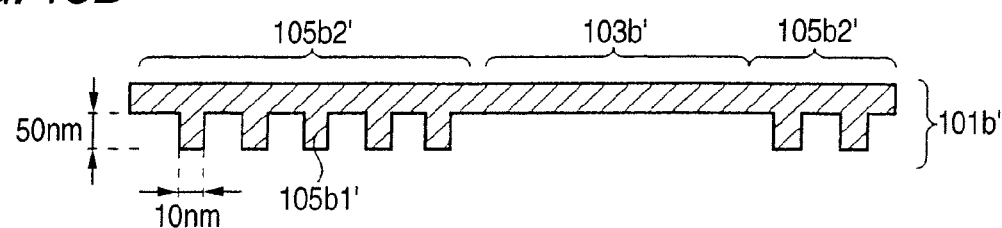

FIGS. 18A and 18B are schematic sectional views showing imprint stampers in which portions corresponding to recording dots are dot-like protrusion portions 105*b*1'. FIG. 18A is a schematic sectional view showing a servo region imprint stamper 101*a*'. FIG. 18B is a schematic sectional view of a data region imprint stamper 101*b*'.

This modification is the same as the ninth embodiment, except that the recess portions in the first transfer regions 103*a* of the servo region imprint stamper 101*a* and the second and third transfer regions 105*b*2 and 105*b*3 of the data region imprint stamper 101*b* are replaced by protrusion portions. Description will be made below chiefly on the different point.

As shown in FIG. 18A, each first transfer region 103*a*' of the servo region imprint stamper 101*a*' is constituted by a plurality of protrusion portions each having a quadrilateral head and having a height of about 50 nm. As shown in FIG. 18B, each of second and third transfer regions 105*b*2' and 105*b*3' of the data region imprint stamper 101*b*' is chiefly constituted by a set of a plurality of dot-like protrusion portions 105*b*1' arrayed like a hexagonal lattice. The dot-like protrusion portions 105*b*1' correspond to recording dots. In this embodiment, each dot-like protrusion portion 105*b*1' is assumed to have a diameter of about 10 nm in top view, and a height of about 50 nm. A distance between centers of adjacent ones of the plurality of dot-like protrusion portions 105*b*1' is about 25 nm. Incidentally, the dot-like protrusion portion 105*b*1' can have any shape if it is circular in top view. Therefore, though the dot-like protrusion portion 105*b*1' is columnar in FIG. 18B, it may have a semispherical shape or the like.

Generally in the background art, when a method for mixing a plurality of methods on a single substrate is used, it is considered that a self-assembled material is applied after a positioning signal is drawn in each servo region. In this case, the servo region intended to be formed by artificial drawing is also covered with a pattern using the self-assembled material. As a result, an unnecessary dot-like recess or protrusion portion also appears in the servo region so that the accuracy of the positioning signal in the servo region deteriorates. However, when a magnetic recording medium is manufactured by use of the imprint stamper according to this embodiment, there is no fear that the dot-like recess or protrusion portion unnecessary for the servo region is produced. Thus, it is possible to enhance the positioning accuracy.

The imprint stamper according to this embodiment is characterized in that a third transfer region corresponding to a positioning signal is provided in a data region. As described above, due to this characteristic, it is possible to correct relative misregistration between each data region and each servo region caused by transferring the servo region imprint stamper 101a and the data region imprint stamper 101b to a single substrate in turn.

The magnetic recording medium manufactured in the manufacturing method according to this embodiment is characterized in that a recess/protrusion structure of each servo region and a recess/protrusion structure of each data region can be selected suitably for an individual magnetic recording medium when there are a plurality of different kinds of combinations of the recess/protrusion structure of the servo region and the recess/protrusion structure of the data region. Due to this characteristic, there is an effect that the recess/protrusion structure of each servo region optimized for individual magnetic recording/reproducing apparatus can be selected in spite of a fixed recess/protrusion structure of each data region.

When there is a difference in life between the servo region medium imprint stamper 101a and the data region medium imprint stamper 101b, each imprint stamper can be exchanged separately. Thus, there is an effect that the period of use of the imprint stamper unnecessary to exchange can be extended. Incidentally, the same effects can be applied to the modification.

Tenth Embodiment

A magnetic recording medium manufacturing imprint stamper according to the tenth configuration of the invention will be described below with reference to FIGS. 16C and 17C. This embodiment shows an example of an imprint stamper in which a data region imprint stamper and a servo region imprint stamper as described above are combined to achieve batch transfer.

Figure 16C:
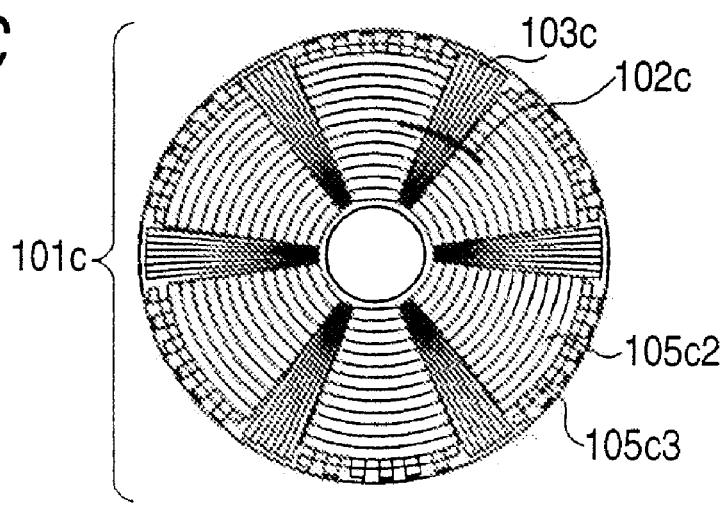

FIG. 16C is a schematic surface view showing a transfer surface of a composite type imprint stamper 101c. FIG. 17C is a schematic sectional view of a portion of the composite type imprint stamper 101c designated by the solid line 102c.

The composite type imprint stamper 101c in FIG. 16C is manufactured as follows. That is, the servo region imprint stamper 101a in FIG. 16A and the data region imprint stamper 101b in FIG. 16B are transferred in turn onto a single substrate so as to form a master, which is further transferred. In addition, the composite type imprint stamper 101c serves to manufacture the magnetic recording medium 101e depicted in FIG. 12A.

Incidentally, a background-art physical method is used as a positioning method in a process for transferring the servo region imprint stamper 101a and the data region imprint stamper 101b in turn to thereby manufacture the composite type imprint stamper 101c. Accordingly, though no misregistration is observed in FIG. 16C which is a macroscopically schematic view of the several-inch disk, it is highly likely that misregistration not larger than about 30 μm occurs between the first transfer regions 103c and the second and third transfer regions 105c2 and 105c3 of the composite type imprint stamper 101c microscopically.

The composite type imprint stamper 101c in FIG. 16C corresponds to the servo region imprint stamper 101a in FIG. 16A, the data region imprint stamper 101b in FIG. 16B and the magnetic recording medium 101e in FIG. 12A. That is, each first transfer region 103c of the composite type imprint stamper 101c corresponds to each first transfer region 103a of the servo region imprint stamper 101a, and further corresponds to each servo region 103e of the magnetic recording medium 101e. Each second transfer region 105c2 of the composite type imprint stamper 101c corresponds to each second transfer region 105b2 of the data region imprint stamper 101b, and further corresponds to each data recording region 105e2 of the magnetic recording medium 101e. Each third transfer region 105c3 of the composite type imprint stamper 101c corresponds to each third transfer region 105b3 of the data region imprint stamper 101b, and further corresponds to each data recording region 105e3 of the magnetic recording medium 101e.

That is, as shown in FIG. 16C, on the composite type imprint stamper 101c, each first transfer region 103c corresponding to each servo region 103e is a radial region running from the inner edge toward the outer edge. Six regions like this in total are formed. In the same manner, the second and third transfer regions 105c2 and 105c3 corresponding to the data regions 105e are regions other than the first transfer regions 103c, that is, six radial regions in total running from the inner edge toward the outer edge. Further, the second transfer regions 105c2 are radial regions located in the inner edge portion on the composite type imprint stamper 101c, and the third transfer regions 105c3 are fan-shaped regions located in the outer edge portion.

The recess/protrusion structures of the first transfer regions 103c in the composite type imprint stamper 101c are similar to those of the first transfer regions in the servo region imprint stamper. The recess/protrusion structures of the second and third transfer regions 105c2 and 105c3 are similar to those of the second and third transfer regions in the data region imprint stamper.

Figure 17C:
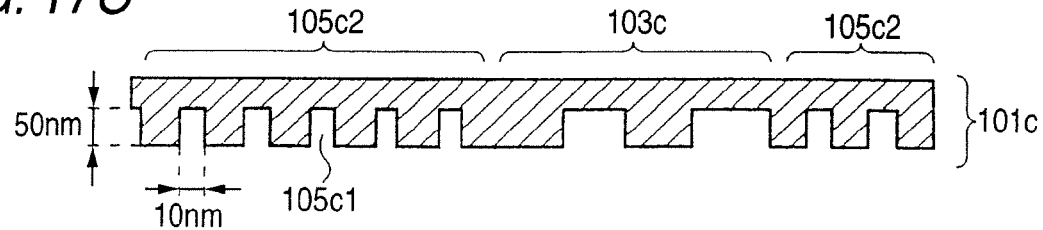

FIG. 17C shows a schematic sectional view of the first and second transfer regions 103c and 105c2. The first transfer region 103c is constituted by a plurality of recess portions each having a quadrilateral bottom. The second transfer region 105c2 has a region corresponding to the recording zone and constituted by a plurality of dot-like recess portions 105c1 corresponding to recording dots and arrayed like a hexagonal lattice, and a guide zone having no recess portion. The third transfer region 105c3 is constituted by regions corresponding to a preamble signal region, an address signal region, a burst signal region, etc. in the magnetic recording medium. Each region corresponding to each signal region has a pattern constituted by a quadrilateral section made of dot-like recess portions and a quadrilateral section having no recess portion.

Incidentally, the material of the composite type imprint stamper 101c is similar to those of the servo region imprint stamper and the data region imprint stamper described in the ninth embodiment.

A modification of the tenth embodiment will be described below.

In this modification, the portions corresponding to recording dots in the imprint stamper according to the tenth embodiment are replaced by protrusion portions. The modification will be described below with reference to FIG. 18C.

The composite type imprint stamper 101c' is manufactured as follows. That is, the servo region imprint stamper 101a' and the data region imprint stamper 101b' in the modification of the ninth embodiment are transferred in turn onto a single substrate so as to form a master, which is further transferred.

Figure 18C:
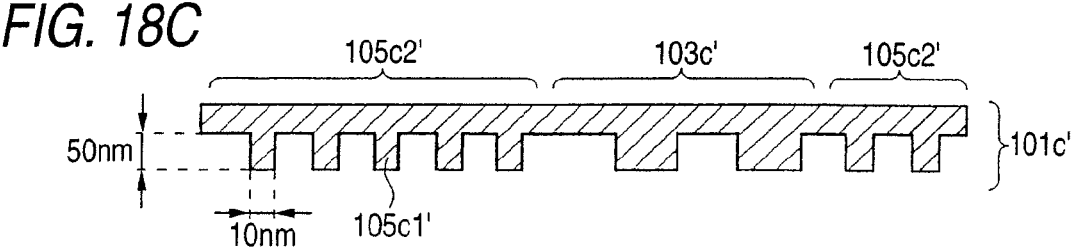

Accordingly, FIG. 18C is a schematic sectional view of the composite type imprint stamper 101c' in which portions corresponding to recording dots are dot-like protrusion portions 105c1'. FIG. 18C corresponds to the servo region imprint stamper 101a' depicted in FIG. 18A and the data region imprint stamper 101b' depicted in FIG. 18B.

This modification is the same as the aforementioned embodiment, except that the recess portions in the first transfer regions 103c, the second transfer regions 105c2 and the third transfer regions 105c3 of the composite type imprint stamper 101c are replaced by protrusion portions. Description will be made below chiefly on the different point.

As shown in FIG. 18C, each first transfer region 103c' of the composite type imprint stamper 101c' is constituted by a plurality of protrusion portions each having a quadrilateral head. Each second transfer region 105c2' is chiefly constituted by a plurality of dot-like protrusion portions 105c1' corresponding to recording dots and arrayed like a hexagonal lattice. The same thing can be applied to each third transfer region 105c3'. Incidentally, the dot-like protrusion portion 105c1' can have any shape if it is circular in top view. Therefore, though the dot-like protrusion portion 105c1' is columnar in FIG. 18C, it may have a semispherical shape or the like.

The composite type imprint stamper 101c according to this embodiment is characterized in that each data region also includes a region corresponding to a positioning signal. As described above, due to this characteristic, it is possible to correct relative misregistration between each servo region and each data region caused by transferring the servo region imprint stamper and the data region imprint stamper in turn onto a single substrate.

In addition, by use of the composite type imprint stamper 101c, the first transfer regions 103c, the second transfer regions 105c2 and the third transfer regions 105c3 can be transferred in a lump when a magnetic recording medium is manufactured. In the manufacturing method using the servo region medium imprint stamper and the data region medium imprint stamper according to the ninth embodiment, the imprint stampers are transferred in turn. According to this embodiment, therefore, the time (for example, about 3 seconds) required for one transfer process can be shortened in comparison with that according to the ninth embodiment.

Further, as described above, there is a limit in positioning accuracy in the transfer process. When a physical positioning method is used, there occurs misregistration not larger than about 30 μm. In this embodiment, relative misregistration between servo regions and data regions occurs in the process for transferring the servo region imprint stamper and the data region imprint stamper in turn. Accordingly, when magnetic recording media are manufactured by direct use of the servo region imprint stamper and the data region imprint stamper, relative misregistration between servo regions and data regions differs from one magnetic recording medium to another. It is therefore necessary to acquire relative misregistration information about all the magnetic recording media.

On the other hand, in this embodiment, the servo region imprint stamper and the data region imprint stamper are used in the process for producing a master. After the master 1s manufactured, the composite type imprint stamper 101c is manufactured. In this event, all the magnetic recording media coming from the same master have identical relative misregistration information. Accordingly, when magnetic recording media are manufactured using the composite type medium imprint stamper 101c, once relative misregistration information between servo regions and data regions of a magnetic recording medium is acquired, the relative misregistration information can be used for all the magnetic recording media coming from the same master.

In the existing circumstances, it is believed that about 100 imprint stampers can be produced from one master, and about 100,000 magnetic recording media can be produced from one imprint stamper. Assume that in the manufacturing process, relative misregistration information between servo regions and data regions is acquired and stored in a memory unit of magnetic information recording/reproducing apparatus. In this case, if misregistration information of one magnetic recording medium produced by use of the composite type imprint stamper 101c is acquired, misregistration information of about 10,000,000 magnetic recording media can be obtained. For this misregistration information acquiring process, it takes about 10 seconds per medium. Accordingly, the time to manufacture about 10,000,000 magnetic recording media can be further shortened by about 100 million seconds, that is, about 30,000 hours.

From the above description, this embodiment is suitable for mass production of magnetic recording media having high recording density and high positioning accuracy. Incidentally, the same effects can be applied to the modification.

Eleventh Embodiment

Magnetic information recording/reproducing apparatus according to the eleventh configuration of the invention will be described below. The magnetic information recording/reproducing apparatus according to this embodiment includes the magnetic recording medium according to the seventh embodiment.

The magnetic information recording/reproducing apparatus according to the eleventh embodiment includes the magnetic recording medium according to the seventh embodiment, a drive unit for driving the magnetic recording medium, a recording/reproducing head for sweeping the magnetic recording medium, an electronic circuit for processing signals to be inputted/outputted to/from the recording/reproducing head, a unit for calculating relative position information between a servo region and a data region based on a positioning signal of the servo region and a positioning signal of the data region read by the recording/reproducing head, and a control unit for controlling the position of the recording/reproducing head on the recording medium based on the relative position information. By use of the magnetic information recording/reproducing apparatus, recording/reproducing the magnetic recording medium is performed in the magnetic information recording/reproducing method described in the eighth embodiment. Incidentally, the control unit is constituted by a disk-arm type recording/reproducing head moving mechanism corresponding to a disk-like magnetic recording medium, and a control circuit.

A modification of the eleventh embodiment will be described below.

Magnetic information recording/reproducing apparatus including a magnetic recording medium having a quadrilateral surface shape according to a modification of the seventh embodiment will be described with reference to FIG. 19. This modification is the same as the aforementioned embodiment, except that the magnetic recording medium and each unit have different shapes from those in the aforementioned embodiment. The applications and effects of this modification are similar to those of the aforementioned embodiment.

Figure 19:
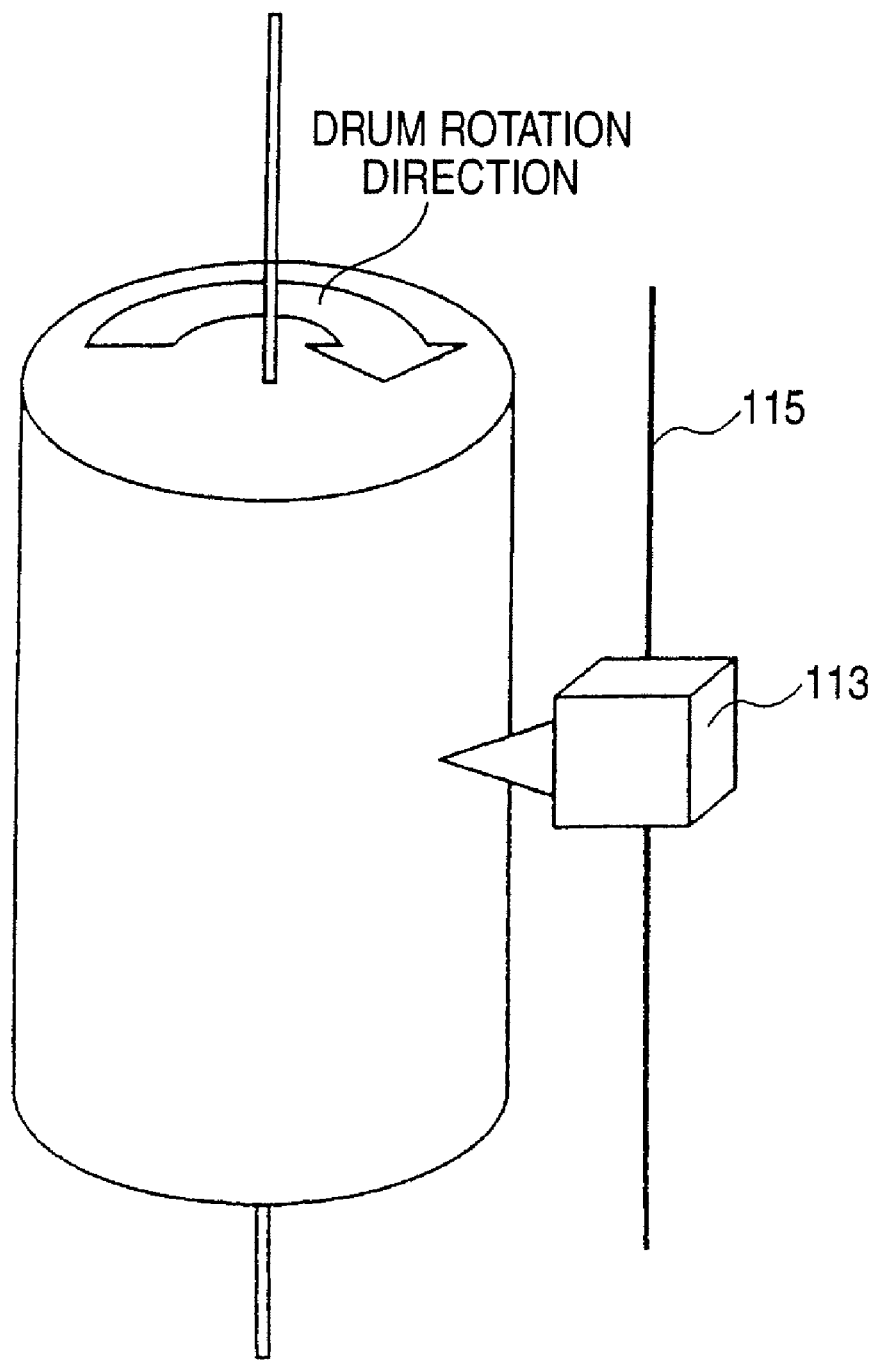
FIG. 19 is a schematic perspective view for explaining a modification of a eleventh embodiment related to a eleventh configuration of the invention.

FIG. 19 is an internal schematic perspective view for explaining the magnetic information recording/reproducing apparatus in which the magnetic recording medium is a drum type. As shown in FIG. 19, the magnetic recording medium in this modification is a drum type, and the surface shape thereof is quadrilateral. The drum rotates in a fixed direction. A recording/reproducing head 113 moves up/down along a head moving shaft 115 which is a recording/reproducing head moving mechanism, so as to perform magnetic information recording/reproducing.

By this magnetic information recording/reproducing apparatus, relative misregistration between servo regions and data regions produced when the servo regions and the data regions are manufactured in different methods can be corrected easily, simply and accurately based on relative misregistration information acquired from positioning signal regions in the servo regions and the data regions. Incidentally, this effect can be applied to the modification.

Twelfth Embodiment

Magnetic information recording/reproducing apparatus according to the twelfth configuration of the invention will be described below. In this embodiment, magnetic information recording/reproducing apparatus including a magnetic recording medium according to the seventh embodiment will be described. In addition, the magnetic information recording/reproducing apparatus according to this embodiment has a memory unit, supporting the modification of the eighth embodiment.

The magnetic information recording/reproducing apparatus according to the twelfth embodiment includes the magnetic recording medium according to the seventh embodiment, a drive unit for driving the magnetic recording medium, a recording/reproducing head for sweeping the magnetic recording medium, an electronic circuit for processing signals to be inputted/outputted to/from the recording/reproducing head, a memory unit for storing relative position information between servo regions and data regions, and a control unit for controlling the position of the recording/reproducing head on the magnetic recording medium based on the relative position information.

When the magnetic information recording/reproducing apparatus is manufactured, there is required a process for calculating relative position information between a servo region and a data region of the magnetic recording medium based on positioning signals of the servo region and the data region. However, when the magnetic recording medium is manufactured by use of the composite type imprint stamper described in the tenth embodiment, the manufacturing time can be prevented from extending over a long period of time.

Incidentally, the magnetic recording medium according to the seventh embodiment may be used as the memory unit of the magnetic information recording/reproducing apparatus.

In the eleventh embodiment, the process for calculating the relative position information between a servo region and a data region is required whenever recording/reproducing is performed. However, by use of the magnetic information recording/reproducing apparatus according to the twelfth embodiment, the process is dispensable. Thus, the recording/reproducing can be performed more quickly by the time required for the process.

Thirteenth Embodiment

Description will be made below on magnetic information recording/reproducing apparatus according to the thirteenth configuration of the invention. In this embodiment, description will be made on magnetic information recording/reproducing apparatus including the magnetic recording medium having servo regions and data recording regions and manufactured by the composite type imprint stamper according to the tenth embodiment. The magnetic information recording/reproducing apparatus according to this embodiment has no data positioning region on the magnetic recording medium included in the magnetic information recording/reproducing apparatus, but has a memory unit for storing relative position information between the servo regions and the data regions.

The magnetic information recording/reproducing apparatus according to the thirteenth embodiment includes the magnetic recording medium having servo regions and data regions, a drive unit for driving the magnetic recording medium, a recording/reproducing head for sweeping the magnetic recording medium, an electronic circuit for processing signals to be inputted/outputted to/from the recording/reproducing head, a memory unit for storing relative misregistration information of the data regions with respect to the servo regions, and a control unit for controlling the position of the recording/reproducing head on the magnetic recording medium based on the relative position information.

The magnetic information recording/reproducing apparatus according to this embodiment is characterized in that it has no data positioning signal region in the magnetic recording medium, but it has relative misregistration information of the data regions with respect to the servo regions. A method for manufacturing the magnetic information recording/reproducing apparatus will be described below.

First, the servo region imprint stamper and the data region imprint stamper according to the ninth embodiment are manufactured. In this event, each imprint stamper is manufactured to have a larger diameter than the diameter of the magnetic recording medium which will be manufactured later, while third transfer regions of the data region imprint stamper are located in an outer edge portion outside the magnetic recording medium which will be manufactured later. Assume that the magnetic recording medium in the magnetic information recording/reproducing apparatus has a diameter of about 6.5 cm. Then, each imprint stamper has a diameter of about 6.54 cm, and the third transfer regions are located in a region not larger than about 0.02 cm from the outer edge of the disk.

Next, the servo region imprint stamper and the data region imprint stamper are transferred in turn so as to manufacture a master. In this event, the relative misregistration between the servo regions and the data regions is proper to the master. Accordingly, when about 10,000,000 magnetic recording media come from one and the same master, relative misregistration information can be shared among them.

Next, the master is transferred to manufacture a composite type imprint stamper. The composite imprint stamper includes third transfer regions and has a diameter of about 6.54 cm.

Next, the composite type imprint stamper is transferred to manufacture a magnetic recording medium A having a diameter of about 6.54 cm. The magnetic recording medium A has servo regions in a portion having a diameter not larger than about 6.54 cm, data recording regions in a portion having a diameter not larger than about 6.5 cm, and data positioning regions in a region not larger than about 0.02 cm from the outer edge of the disk. After that, only a portion of about 6.5 cm in diameter from the disk center on the inner side is transferred to manufacture magnetic recording media B each having servo regions and data recording regions. Of the manufactured magnetic recording media, only the magnetic recording medium A has the same shape as the magnetic recording medium 101*e* in the seventh embodiment, except that there is a difference in diameter. Since the magnetic recording medium A has data positioning regions, relative position information between the servo regions and the data regions can be acquired using the method described in the eighth embodiment.

The relative position information can be applied to the magnetic recording media B coming from the same master as the magnetic recording medium A and having no data positioning region. Accordingly, the relative position information is recorded in memory units of about 10,000,000 pieces of magnetic information recording/reproducing apparatus including the magnetic recording media B having servo regions and data recording regions. Thus, it is possible to manufacture magnetic information recording/reproducing apparatus having magnetic recording media whose positioning accuracy is about 2 nm and whose recording density is about 800 Gbpsi.

Incidentally, as for composite type imprint stampers to be manufactured from the master, the first one must have the third transfer regions, but the second one et seq. may have only the first and second transfer regions.

After the relative position information between the servo regions and the data regions is acquired, the data positioning signal regions 105e3 become unnecessary. Thus, the regions may be cut out. In that case, the magnetic recording medium A has a diameter of about 8.0 cm, provided with the servo regions 103e and the data recording regions 105e2 in a portion having a diameter not larger than about 6.5 cm, and the servo regions 103e and the data positioning signal regions 105e3 near 7.5 cm in diameter. In addition, the imprint stamper for manufacturing the magnetic recording medium A has a diameter of about 8.0 cm, provided with the third transfer regions. Incidentally, when the cutting method is used, not only one magnetic recording medium A but a large number of magnetic recording media A may be manufactured.

In the magnetic recording medium according to the seventh embodiment, when the dimensions of the magnetic recording medium are fixed, the positioning accuracy of data regions with respect to servo regions is enhanced with the increase of the area of data positioning signal regions of the magnetic recording medium. However, the data recording regions of the magnetic recording medium are narrowed relatively so that the recording density of the magnetic recording medium is lowered. On the other hand, according to the thirteenth embodiment, the data positioning signal regions are placed in a non-standard portion. Accordingly, there is no fear that the data recording regions are narrowed due to the increase of the data positioning signal regions. Thus, increase in positioning accuracy of the data regions with respect to the servo regions and increase in recording density of the data regions become compatible.

In the same manner as in the twelfth embodiment, it is not necessary to calculate relative position information between the servo regions and the data regions whenever recording/reproducing is performed. Thus, recording/reproducing can be performed more quickly by the time required for the calculation.

Although the embodiments of the invention have been described above, the invention is not limited to the embodiments but may be changed variously if the change is within the gist of the invention as stated in Claims.

In addition, the invention may be modified variously without departing from the gist of the invention when the invention is carried out.

Further, various configurations of the invention can be formed in a suitable combination of a plurality of constituent members disclosed in the aforementioned embodiments. For example, some constituent members may be deleted from all the constituent members shown in each embodiment. Further, constituent members over different embodiments may be combined suitably.

What is claimed is:

1. A method for manufacturing a magnetic recording medium manufacturing imprint stamper comprising:

coating a surface of a stamper material with a first resist film;

forming a mold pattern of quadrilaterals in a first transfer region in the first resist film of the stamper material corresponding to a servo region of a magnetic recording medium by an artificial drawing method;

etching the surface of the stamper material with the first resist film as a mask to preserve a flat surface in a first non-transfer region of the stamper material located in conformity with a data region of the magnetic recording medium so as to form a servo region master imprint stamper which corresponds to the magnetic recording medium using a sector servo system;

applying a second resist film on a substrate and forming recess portions in a region of the second resist film formed on the substrate while locating the region in conformity with the data region of the magnetic recording medium;

filling the recess portions in a surface of the substrate with a self-assembled material;

giving a phase-separation to the self-assembled material in the substrate;

processing by etching the recess portions in the substrate surface so as to form a molded pattern with a plurality of dots arrayed in a form of a hexagonal lattice;

electroforming the molded pattern to thereby produce a data region master imprint stamper having a mold pattern with a plurality of dots arrayed in a form of a hexagonal lattice in a second transfer region corresponding to the data region of the magnetic recording medium;

transferring the mold pattern of the servo region master imprint stamper and the data region master imprint stamper in succession to a same surface of a master substrate so as to form a master having a molded pattern in the same surface thereof; and electroforming the molded pattern of the master to thereby form a medium imprint stamper having a mold pattern.

2. A method for manufacturing a magnetic recording medium comprising:

coating a surface of a stamper material with a first resist film;

forming a mold pattern of quadrilaterals in a first transfer region in the first resist film of the stamper material corresponding to a servo region of a magnetic recording medium by an artificial drawing method;

etching the surface of the stamper material with the first resist film as a mask to preserve a flat surface in a first non-transfer region of the stamper material located in conformity with a data region of the magnetic recording medium so as to form a servo region master imprint stamper which corresponds to the magnetic recording medium using a sector servo system;

applying a second resist film on a substrate and forming recess portions in a region of the resist film formed on the substrate while locating the region in conformity with the data region of the magnetic recording medium;

filling the recess portions in a surface of the substrate with a self-assembled material;

giving a phase-separation to the self-assembled material in the substrate;

processing by etching the recess portions in the substrate surface so as to form a molded pattern with a plurality of dots arrayed in a form of a hexagonal lattice;

electroforming the molded pattern to thereby produce a data region master imprint stamper having a mold pattern with a plurality of dots arrayed in a form of a hexagonal lattice in a second transfer region corresponding to the data region of the magnetic recording medium;

transferring the mold pattern of the servo region master imprint stamper and the data region master imprint stamper in succession to a same surface of a master substrate so as to form a master having a molded pattern in the same surface thereof the surface including a region patterned with a plurality of quadrilaterals and a region patterned with a plurality of dots arrayed in a form of a hexagonal lattice;

electroforming the molded pattern of the master to thereby form a composite-type medium imprint stamper having a mold pattern; and transferring the mold pattern of the composite-type medium imprint stamper to a magnetic recording medium substrate so as to produce a magnetic recording medium having magnetic recording materials arranged in a molded pattern.

3. The method for manufacturing a magnetic recording medium according to claim 2, wherein the self-assembled material is a self-assembled material by which portions of the composite-type medium imprint stamper corresponding to the recording materials are formed as recess portions in the forming the mold pattern; and wherein the transferring the mold pattern of the composite-type medium imprint stamper to the magnetic recording medium substrate so as to produce a magnetic recording medium having a molded pattern, the transferring includes:

transferring the mold pattern of the composite-type medium imprint stamper to a resist film formed on a magnetic recording medium producing substrate having a magnetic layer so as to form a molded pattern in the resist film; and processing the magnetic layer based on the molded pattern of the resist film on the magnetic recording medium producing substrate.

4. A method for manufacturing a magnetic recording medium comprising:

coating a surface of a stamper material with a first resist film;

forming a mold pattern of quadrilaterals in a first transfer region in a first resist film of the stamper material corresponding to a servo region of a magnetic recording medium by an artificial drawing method;

etching the surface of the stamper material with the first resist film as a mask to preserve a flat surface in a first non-transfer region of the stamper material located in conformity with a data region of the magnetic recording medium so as to form a servo region medium imprint stamper which corresponds to the magnetic recording medium using a sector servo system;

applying a second resist film on a substrate and forming recess portions in a region of the resist film formed on the substrate while locating the region in conformity with the data region of the magnetic recording medium;

filling the recess portions in a surface of the substrate with a self-assembled material;

giving a phase-separation to the self-assembled material in the substrate;

processing by etching the recess portions in the substrate surface so as to form a molded pattern with a plurality of dots arrayed in a form of a hexagonal lattice;

electroforming the molded pattern to thereby produce a data region medium imprint stamper having a mold pattern with a plurality of dots arrayed in a form of a hexagonal lattice in a second transfer region corresponding to the data region of the magnetic recording medium;

transferring the mold pattern of the servo region medium imprint stamper and the data region master imprint stamper in succession to a same surface of a magnetic recording medium substrate so as to form a magnetic recording medium whose same surface has a region patterned with a plurality of quadrilaterals and a region patterned with a plurality of dots arrayed in a form of a hexagonal lattice.

* * * * *